US011561891B1

(12) United States Patent
Boehm et al.

(10) Patent No.: US 11,561,891 B1
(45) Date of Patent: Jan. 24, 2023

(54) ADAPTIVE USER DEFINED HEALTH INDICATION

(71) Applicant: Micron Technology, Inc., Boise, ID (US)

(72) Inventors: Aaron P. Boehm, Boise, ID (US); Todd Jackson Plum, Boise, ID (US); Mark D. Ingram, Boise, ID (US); Scott E. Schaefer, Boise, ID (US); Scott D. Van De Graaff, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/500,751

(22) Filed: Oct. 13, 2021

(51) Int. Cl.
  *G06F 12/00* (2006.01)
  *G06F 12/02* (2006.01)
  *G06F 11/34* (2006.01)

(52) U.S. Cl.
  CPC ........ *G06F 12/023* (2013.01); *G06F 11/3495* (2013.01); *G06F 2212/7211* (2013.01)

(58) Field of Classification Search
  CPC .............. G06F 12/023; G06F 12/0238; G06F 12/0246; G06F 11/3495; G06F 2212/7211
  See application file for complete search history.

(56) References Cited

U.S. PATENT DOCUMENTS

| 6,249,838 | B1* | 6/2001 | Kon ..................... G11C 16/349 |
| | | | 711/E12.008 |
| 9,563,552 | B2* | 2/2017 | Tamura ................. G06F 11/108 |
| 9,690,696 | B1* | 6/2017 | Hefner .................. G06F 12/123 |
| 2010/0002523 | A1* | 1/2010 | Park ..................... G11C 16/344 |
| | | | 365/185.18 |
| 2014/0022008 | A1* | 1/2014 | Noorlag ............. G01R 31/2856 |
| | | | 327/540 |

\* cited by examiner

*Primary Examiner* — Shawn X Gu
(74) *Attorney, Agent, or Firm* — Holland & Hart LLP

(57) ABSTRACT

Methods, systems, and devices for adaptive user defined health indications are described. A host device may be configured to dynamically indicate adaptive health flags for monitoring health and wear information for a memory device. The host device may indicate, to a memory device, a first index. The first index may correspond to a first level of wear of a set of multiple indexed levels of wear for the memory device. The memory device may determine that a metric of the memory device satisfies the first level of wear and indicate, to the host device, that the first level of wear is satisfied. The host device may receive the indication that the first level of wear is satisfied and indicate, to the memory device, a second level of wear of the set of indexed levels of wear that is different than the first level of wear.

35 Claims, 9 Drawing Sheets

ADAPTIVE USER DEFINED HEALTH INDICATION

FIELD OF TECHNOLOGY

The following relates generally to one or more systems for memory and more specifically to adaptive user defined health indications.

BACKGROUND

Memory devices are widely used to store information in various electronic devices such as computers, user devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
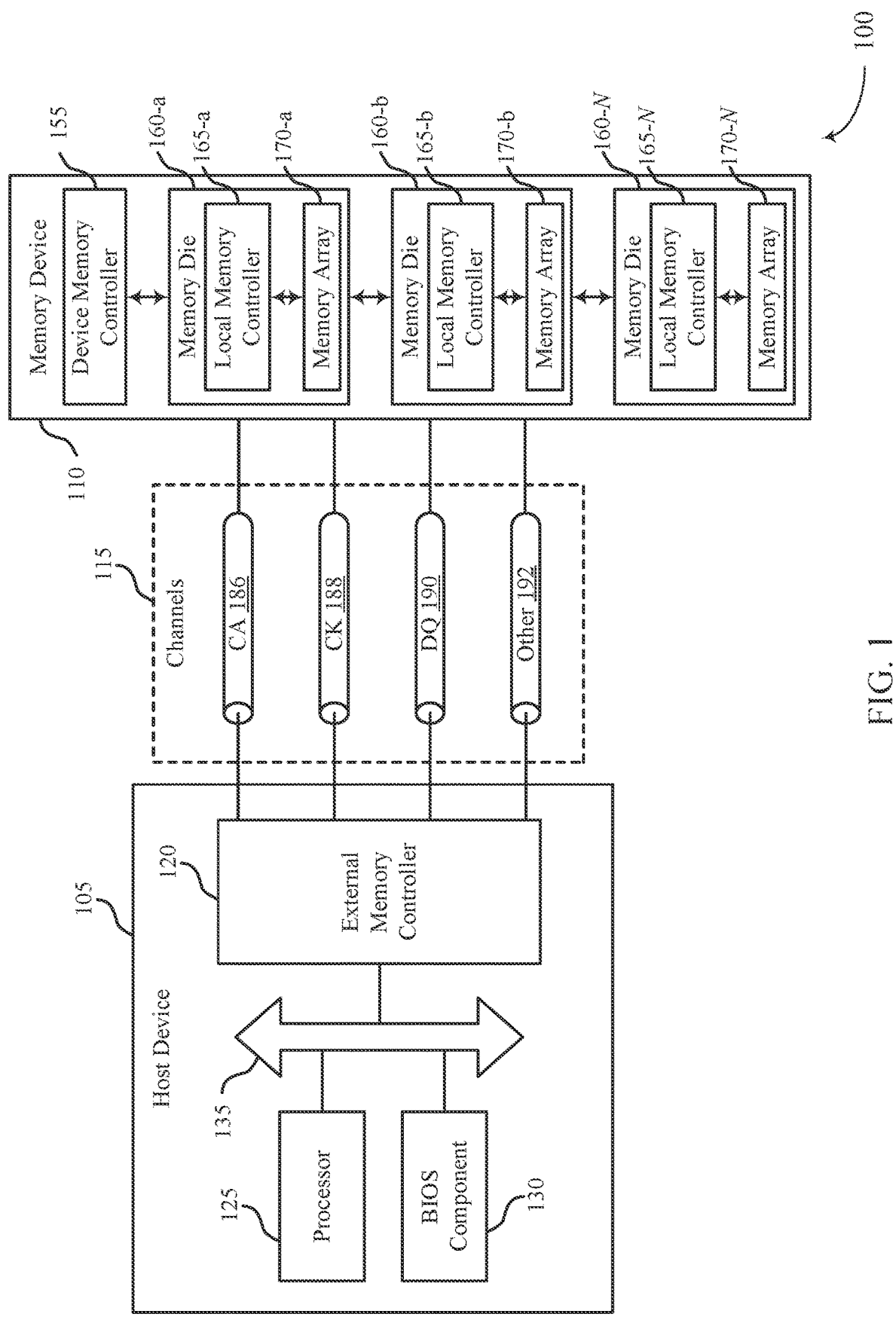
FIG. 1 illustrates an example of a system that supports adaptive user defined health indications in accordance with examples as disclosed herein.

Memory device health or reliability may be impacted by one or more factors, such as normal device use, heavy device use, or an "aggressor" attack on the memory device. Reduced reliability may include degradation of circuits (e.g., including degradation of one or more transistors or other components) or compromised data integrity via repeated access operations (e.g., a row hammer). In some systems, a memory device may be configured to warn a source external to the memory device (e.g., a host device) of performance issues, such as possible wear-out or performance degradation of one or more components within the memory device. For example, the memory device may flag the host device when a metric of the memory device reaches a threshold percentage of wear-out. However, different components and metrics within the memory device may wear out at different rates (e.g., each component may follow a different wear-out curve having a different slope). A host device that receives a flag or health monitoring indication at a single wear-out point may not support identification of varying rates of degradation for different use cases. For example, the host device may not accurately estimate an end-of-life of each component when the components have different rates of degradation.

The present disclosure provides techniques for dynamically indicating adaptive health flags for monitoring health information of a memory device. A host device may configure a set of multiple indexed levels of wear for the memory device. The host device may dynamically indicate, to the memory device, an index corresponding to a respective threshold level of wear of the set of indexed levels of wear. The memory device may monitor one or more metrics of the memory device and indicate, to the host device, when the indicated level of wear has been satisfied by at least one of the one or more metrics. A metric may correspond to a type of component (e.g., a transistor, a diode, a resistor, a metal line, or any other component), a type of measurement performed on the component, a type of stress applied to the component, a rate of degradation of the component, or any combination thereof. The host device may dynamically indicate one or more other levels of wear for the memory device to monitor throughout a life of the memory device (e.g., in response to an indication that a previous level of wear has been satisfied). Such adaptive health monitoring techniques may provide for the host device to track rates of degradation of one or more metrics of the memory device. For example, by obtaining dynamic health monitoring information, the host device may improve reliability and accuracy of end-of-life estimations compared with systems in which the host device obtains health monitoring information at a pass/fail point near an end-of-life of a component.

Features of the disclosure are initially described in the context of systems and dies as described with reference to FIGS. 1 and 2. Features of the disclosure are described in the context of a wear-out curve diagram, a memory device architecture, and a process flow, as described with reference to FIGS. 3-5. These and other features of the disclosure are further illustrated by and described with reference to an apparatus diagram and flowcharts that relate to adaptive user defined health indications as described with reference to FIGS. 6-9.

FIG. 1 illustrates an example of a system 100 that supports adaptive user defined health indications in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105. The host device 105 may be external to the memory device 110 and may communicate with the memory device 110. For example, the host device 105 may transmit an indication of a health status reporting configuration to the memory device 110 and may receive health status information from the memory device 110.

For example, a memory device 110 may include one or more monitoring components (e.g., monitoring circuitry) that may be configured to monitor health and wear information for the memory device 110 (e.g., among other parameters). A source external to the memory device (e.g., a host device 105) may write to a dedicated register (e.g., a configuration register, such as a mode register) of the memory device 110, to configure the memory device with dynamic health status information reporting parameters. The memory device 110 may monitor and report the health status information of the memory device 110 based on the received dynamic health status information reporting parameters, which may be referred to as adaptive threshold levels of wear. The memory device 110 may write one or more values indicative of a health status of the memory device 110 relative to a first indicated threshold level of wear to a dedicated register (e.g., a readout register, such as a mode register) such that the host device 105 may access the information. The host device 105 may write a second threshold level of wear to the configuration register, and the memory device may indicate, via the readout register, when the second threshold level of wear is satisfied. Such dynamic health monitoring may continue until the host device 105 obtains sufficient granularity of health monitoring information to accurately estimate an end-of-life of one or more components within the memory device 110.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include various peripheral components. The peripheral components may be any input device or output device, or an interface (e.g., a bus, a set of one or more pins, or the like) for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, and input component may include a user interface or interface with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a desired capacity or a specified capacity for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel. A pin, a register, a channel, a side channel, or any combination thereof may be used by the host device 105 and the memory device 110, for example, to communicate information regarding a health status monitoring configuration and/or health status information for the memory device 110.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

In some cases, health or reliability of a memory device 110 may be impacted by normal device use, heavy device use, or an attack on the memory device, among other examples. According to aspects described herein, the memory device 110 may include monitors or sensors for detecting memory device health issues, such as those resulting from device access and/or wear. The memory device 110 may be configured to warn a host device 105 (e.g., a source external to the memory device) of performance issues (e.g., possible wear-out or performance degradation) or of a possible attack (e.g., an action that exceeds expected use or specifications in order to cause a device to malfunction or operate outside of an intended mode), and the host device 105 or the memory device 110 may be configured to implement a corrective action to counteract or deter the detected issues or attack. For example, the host device 105 may set dynamic threshold levels of wear for the memory device 110 to monitor, such that the host device may accurately estimate a wear-out curve and a corresponding end-of-life for one or more components of the memory device 110.

Figure 2:
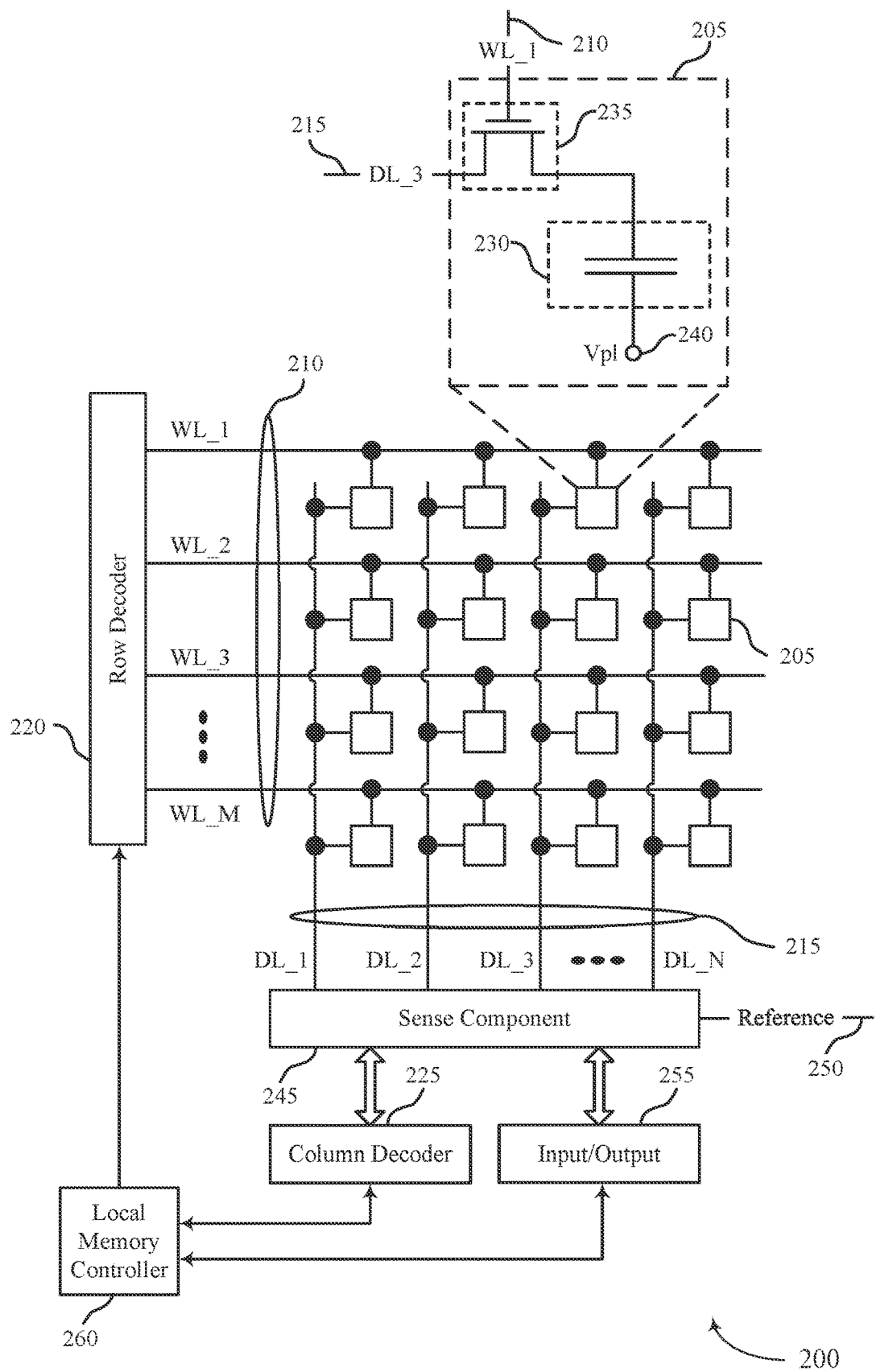
FIG. 2 illustrates an example of a memory die that supports adaptive user defined health indications in accordance with examples as disclosed herein.

FIG. 2 illustrates an example of a memory die 200 that supports adaptive user defined health indications in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

A word line 210 may be a conductive line in electronic communication with a memory cell 205 that is used to perform access operations on the memory cell 205. In some architectures, the word line 210 may be coupled with a gate of a switching component 235 of a memory cell 205 and may be operable to control the switching component 235 of the memory cell. In some architectures, the word line 210 may be coupled with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be operable to couple and/or isolate the capacitor 230 of the memory cell 205 and the digit line 215. In some architectures, the memory cell 205 may be coupled with the digit line 215.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

Some components of a memory device may be impacted by normal device use, by heavier device use, or by an attack on the memory device. For example, a row decoder 220, column decoder 225, switching component 235, or capacitor 230, among other examples (e.g., one or more transistors of the memory die 200, one or more transistors within a component of the memory die 200), may experience repeated or high-duty cycle use that may cause component wear. According to various aspects, the memory device may include monitors or sensors for detecting memory device health issues, such as those resulting from device access and/or wear. The memory device may be configured to warn a source external to the memory device (e.g., a host device) of performance issues (e.g., possible wear-out or performance degradation) or of a possible attack, and the source external to the memory device or the memory device may be configured to implement a corrective action to counteract or deter the detected issues or attack.

In some cases, the memory device may be configured to indicate, to the source external to the memory device, when one or more defined threshold levels of wear (e.g., predefined trip or fail points) are reached (e.g., by setting a bit high or low or by raising a flag). In such cases, the source external to the memory device, such as a host device, may receive an indication that a component of the memory device has reached a threshold percentage of a life expectancy (e.g., 94% of the life expectancy for the component, or some other threshold). The host device may estimate an amount of time remaining in the life of the component based on a nominal wear-out curve (e.g., a linear curve). However, a wear-out curve of one or more components within the memory device may not be a nominal curve. For example, a wear-out curve may be an exponential or power curve. In such cases, the component may have more or less time until an end of life of the component than the host device estimates based on the nominal wear-out curve, which may reduce reliability of the memory system.

To improve health monitoring performance, techniques described herein provide for adaptive health feedback. The host device or a user that operates the memory system may set one or more adaptive health flags, which may be referred to as threshold levels of wear. For example, the host device may set a first threshold level of wear to be 10 percent (e.g., or some other threshold), and the memory device may indicate, to the host device, when 10 percent of life expectancy of a component within the memory device has been used. The host device may subsequently set a second threshold value (e.g., 20 percent, or some other percentage or threshold), and the memory device may indicate when the second threshold value is satisfied. By dynamically setting threshold levels of wear for the memory device to monitor, the host device (e.g., or a user controlling the host device) may adapt a level of granularity of a wear-out curve of one or more components within the memory device.

Figure 3:
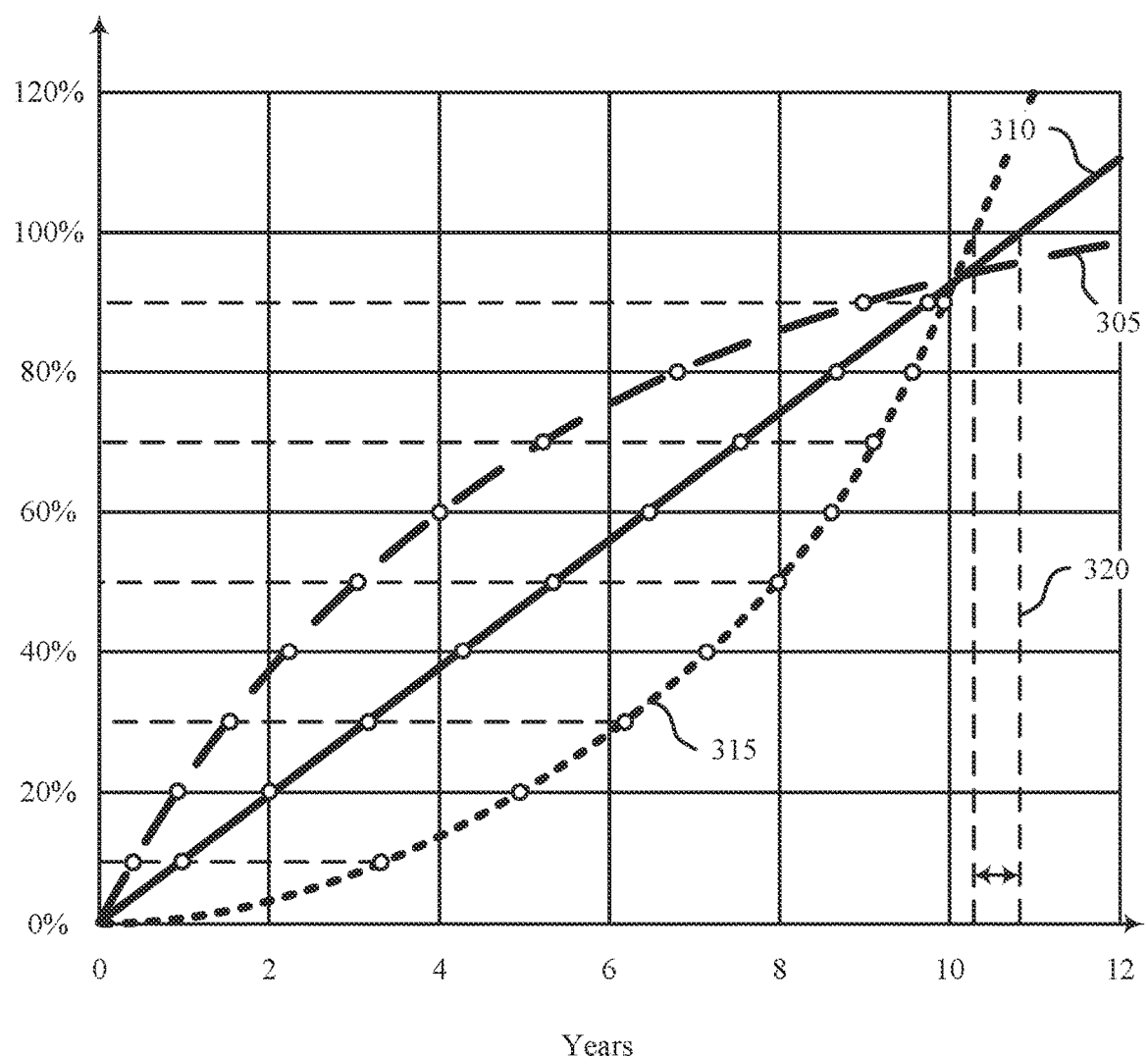
FIG. 3 illustrates an example of a wear-out curve diagram that supports adaptive user defined health indications in accordance with examples as disclosed herein.

FIG. 3 illustrates an example of a wear-out curve diagram 300 that supports adaptive user defined health indications in accordance with examples as disclosed herein. The wear-out curve diagram 300 illustrates three example wear-out curves, including a first wear-out curve 305, a second wear-out curve 310 (e.g., a nominal or linear wear-out line), and a third wear-out curve 315. Each wear-out curve may correspond to a rate of degradation, or a level of wear, of a respective component of a memory device over time, which may be associated with or be referred to as a metric of the memory device.

Each wear-out curve may thereby correspond to a respective metric of a set of metrics of the memory device. The set of metrics may include metrics associated with transistor wear or other wear measured for different types of devices or components. The metrics associated with transistor wear may include threshold voltage drift, current drive, a hot carrier stress degradation, a negative bias temperature instability (NBTI) stress degradation, or the like, for a respective transistor type (e.g., an N-type metal oxide semiconductor (N-MOS) or a P-type metal oxide semiconductor (P-MOS) transistor). In some cases, different metrics may be measured for different types of components, which may include different metrics measured for different transistors, different diodes, different resistors, different metal lines (e.g., measuring electromigration in the lines), or the like, within the memory device.

In the example of FIG. 3, the first wear-out curve 305 may correspond to a first metric, such as a threshold voltage degradation of a first transistor (e.g., a P-MOS transistor) over time. The third wear-out curve 315 may correspond to a second metric, such as a threshold voltage degradation of a second transistor (e.g., an N-MOS transistor) over time. The second wear-out curve 310 may correspond to a third metric. Alternatively, the second wear-out curve 310 may represent a linear or normalized wear-out line of a metric such as the first metric or the second metric. Although three example wear-out curves are illustrated, it is to be understood that a memory device may include any quantity of components and may monitor any quantity of metrics (e.g., and associated wear-out curves) associated with a respective component, including the metrics listed herein, or other metrics not explicitly described herein.

In some cases, the memory device may notify a source external to the memory device, such as a host device, when a metric satisfies a threshold, which may indicate that a threshold level of wear of an associated component is satisfied (e.g., 90 percent of a life expectancy, or some other threshold level). For example, with reference to FIG. 3, the host may be notified (e.g., at around year 9 of the life of the memory device) that the first metric associated with the first wear-out curve 305 has reached a threshold of 90 percent of life expectancy, which may be referred to as a 90 percent threshold level of wear. The host device may determine or indicate device operational information, such as a health status or warning information, based on the indication that the 90 percent threshold level of wear is satisfied.

In some cases, the host device may not know or be programmed with the general shape of the first wear-out curve 305 associated with the first metric or the third wear-out curve 305 associated with the second metric. As such, the host device may assume that the first metric follows the nominal wear-out curve 310, and the host device may estimate that the associated component of the memory device will reach 100 percent of the estimated life expectancy at a first time (e.g., around year 11), as projected by the nominal wear-out curve 310. However, the actual time at which the component may reach 100 percent of the estimated life expectancy may be later than the estimated time (e.g., after year 12), as projected by the corresponding wear-out curve 305.

Similarly, the host device may estimate that the second metric associated with the third wear-out curve 315 will reach 100 percent of the life expectancy at the first time (e.g., around year 11) based on the nominal wear-out curve 310, but the second metric may actually reach 100 percent before the first time (e.g., before year 11), as projected by the third wear-out curve 315. A difference 320 between the actual end-of-life for the metric associated with the wear-out curve 315 and an end-of-life for the metric estimated based on the nominal wear-out curve 310 is illustrated by the vertical dashed lines in FIG. 3. The difference 320 in actual and estimated end-of-life may result in inaccurate wear-out estimates and reduced safety and reliability of the memory device, or of the host device.

To improve health monitoring techniques, the host device may dynamically set and/or signal one or more intermediate threshold levels of wear (e.g., associated with a value of a corresponding metric) to the memory device, such that the host device may obtain sufficient granularity of health monitoring data to estimate a wear-out curve for a respective component. The host device may use the identified wear-out curve to predict a time at which the component may reach 100 percent of its life expectancy, which may result in a higher accuracy compared to using the nominal curve 310. The host device may configure a set of threshold levels of wear for the memory device, and may dynamically indicate a respective threshold level of wear of the set of threshold levels of wear to the memory device (e.g., by indicating an index corresponding to the respective threshold level of wear). The memory device may report when one or more metrics have satisfied the indicated threshold level of wear. For example, the memory device may indicate that one or more of the first wear-out curve 305, the second wear-out curve 310, or the third wear-out curve 315 have reached the indicated threshold level of wear. In response to the indication that a metric has satisfied the threshold, the host device may indicate a subsequent level of wear to the memory device.

By dynamically signaling threshold levels of wear, which may be referred to as performing adaptive user-defined health indications, the host device may receive more granular health monitoring information. The host device may thereby identify a wear-out curve for a respective component, which the host device may use to improve an estimation of an end-of-life for the component, the memory device, or both. Methods for configuring and signaling such dynamic threshold levels of wear are described in further detail elsewhere herein, including with reference to FIGS. 4 and 5.

Figure 4:
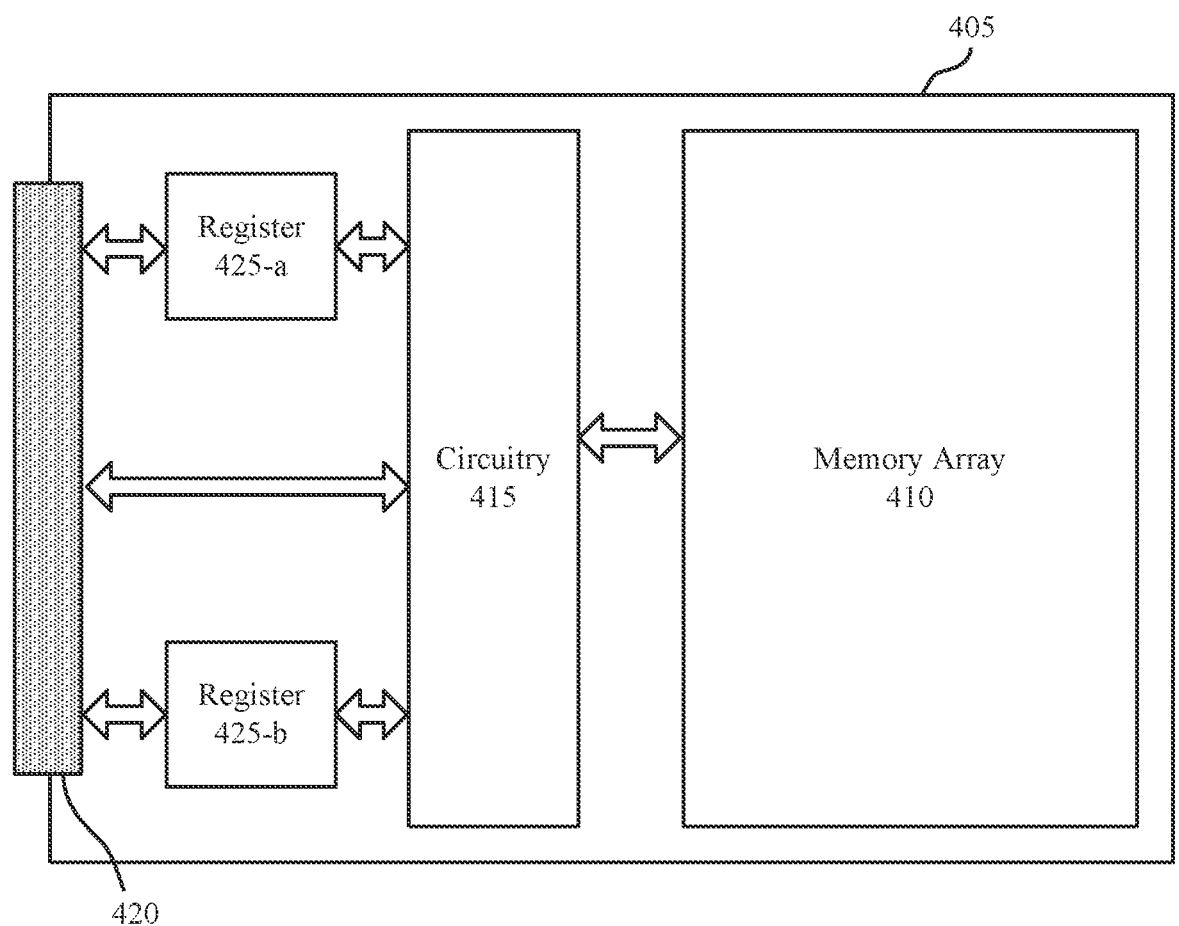
FIG. 4 illustrates an example of a memory device architecture that supports adaptive user defined health indications in accordance with examples as disclosed herein.

FIG. 4 illustrates an example of a memory device architecture 400 that supports adaptive user defined health indications in accordance with examples as disclosed herein. The memory device architecture 400 may include a memory device 405, which may be an example of or may include aspects of a memory device 110 as described with reference to FIG. 1 or a memory die 200 as described with reference to FIG. 2. In some examples, the memory device 405 may be an example of a silicon memory device.

The memory device 405 may include a memory array 410, which may be an example of aspects of a memory array 170 as described with reference to FIG. 1, or an array as described with reference to FIG. 2. The memory array 410 may be a collection (e.g., one or more grids, one or more banks, one or more tiles, one or more sections) of memory cells, with each memory cell being operable to store at least one bit of data.

The memory device 405 may also include circuitry 415 coupled with the memory array 410. The circuitry 415 may include circuitry for monitoring a health, or degradation level, of one or more components of or associated with the memory array 410 (e.g., monitoring circuitry). Additionally or alternatively, the circuitry 415 may include a controller and/or circuitry for operating or accessing the memory array 410. The controller may be an example of aspects of a device memory controller 155 or a local memory controller 165 as described with reference to FIG. 1, or a local memory controller 265 as described with reference to FIG. 2. The circuitry 415, the controller, or both may be operable to control operation of the memory array 410. For example, the circuitry 415 may be operable to access one or more memory cells in response to a command received from a source external to the memory device 405, such as a host device coupled with the memory device 405 (not pictured in FIG. 4) and may, in some cases, represent an access component. The circuitry 415 may also include or be coupled with decoding circuitry, such as one or more row decoders 220 or column decoders 225 as described with reference to FIG. 2, or a command decoder for decoding commands received from a source external to the memory device 405.

The circuitry 415 may be coupled with one or more pins 420 or communication pads (e.g., CA pads and/or DQ pads) via which the circuitry 415 may receive data from and transmit data to the host device or some other source external to the memory device 405. The circuitry 415 may be operable to store the data received via the communication pads and pins 420 in a subset of the memory array 410 (e.g., a subset of the memory cells within the memory array 410). The communication pads and/or pins 420 may be coupled with any quantity of electrically conductive materials that may be associated with communication channels 115 as described with reference to FIG. 1, including data channels 190 and CA channels 186, among other examples.

The circuitry 415 may, in some examples, include monitoring circuitry or some other subset of circuitry configured to monitor one or more health parameters of one or more corresponding systems or subsystems of the memory device 405 (e.g., one or more systems or subsystems of or associated with the memory array 410). The circuitry 415 may include a set of sensors configured to monitor the one or more health parameters of the memory device 405, which may include one or more traffic patterns associated with access operations for the memory device 405, a level of wear of a component (e.g., a resistor, capacitor, transistor, diode, driver, latch, register, or the like) of the memory device 405, a temperature of a component of the memory device 405, an operating frequency of a component of the memory device 405, or any combination thereof (e.g., among other examples).

The memory device 405 may also include one or more registers 425 (e.g., a register 425-a, a register 425-b, and/or one or more other registers 425) which may be used to write information to the memory device 405 from a source external to the memory device 405, such as the host device, or read information from the memory device 405 to the host device. For example, the register 425-a may be configured to be written to (e.g., receive information) from the host device and the register 425-b may be configured to be read by the host device after being written to by the memory device 405 (e.g., in response to a read command, such as a mode register read command), or vice versa. The registers 425 may be coupled with the pins 420, with a communication pad, with a channel or side channel, or any combination thereof such that the registers 425 may be accessed by the host device. The registers 425 may additionally be coupled with the circuitry 415. The register 425-a may represent or be referred to as a configuration register (e.g., a health monitor sensitivity configuration register) or an adaptive flag register and the register 425-b may represent or be referred to as a readout register. The memory device 405 may include more than two registers 425, and in some cases, a register 425 may be configured to be written to and read by the host device or other source external to the memory device 405 (e.g., may perform the functions of both a configuration register and a readout register).

The one or more registers 425 may include or represent respective examples of a mode register, or a programmable register (e.g., programmable by the host device). In some examples, the host device may write to one or more dedicated registers 425 (e.g., a configuration register, such as a mode register) of the memory device 405 to configure the memory device 405. The one or more registers 425 may serve as dedicated access points for monitoring a status or information associated with a health of the memory device 405 and may be enabled or disabled on a device basis. In some cases, one or more aspects of the one or more registers 425 may be performed by one or more other components of the memory device 405 (e.g., may be performed by portions of the circuitry 415 or a controller).

The circuitry 415 may monitor one or more health parameters of the memory device 405, for example, in accordance with a reporting configuration or a monitoring configuration received via a register 425 (e.g., the register 425-a) or in accordance with a default or predefined configuration. As described herein, the memory device 405 may be configured with a set of one or more indexed levels of wear for the memory device 405 and the host device may indicate a respective index to the memory device 405 via the register 425-*a*, which may be a mode register operable to store a quantity of bits configured to indicate respective levels of wear to the memory device 405 (e.g., an available mode register operable to store three bits, or another quantity of bits). The host device may thereby dynamically indicate respective levels of wear or other health information for the circuitry 415 of the memory device 405 to monitor. For example, a first value of the register 425-*a* (e.g., '000') may correspond to a first index indicating a 10 percent level of wear, a second value of the register 425-*a* (e.g., '001') may correspond to a second index indicating a 20 percent level of wear, and so on.

The circuitry 415 of the memory device 405 may be configured to monitor, or read a value from, the register 425-*a*. For example, after the host device writes the value to the register 425-*a* (e.g., indicative of a corresponding index and level of wear), the circuitry 415 may read the value of the register 425-*a* and identify an index that is represented by or that corresponds to the value. The circuitry 415 may determine the corresponding level of wear of the set of indexed levels of wear in accordance with the index. The circuitry 415 may monitor one or more health parameters or health metrics of the memory array 410 in accordance with the indicated level of wear. In some examples, the host device may indicate an indexed level of wear and other health monitoring information via the register 425-*a*, such as a metric corresponding to the indexed level of wear (e.g., a metric to monitor and report on when the indexed level is reached).

Upon identifying the level of wear indicated via the register 425-*a*, the circuitry 415 may also be operable to read data or access health monitoring information stored in the memory array 410, to access health monitoring information written to a second register 425, or both. The circuitry 415 may determine whether a health metric of the memory device 405 satisfies the level of wear based on accessing the health monitoring information.

The circuitry 415 may be operable to send an indication to the host device if a health metric of the memory device 405 satisfies the indicated level of wear. The circuitry 415 may write a value to the register 425-*b* to indicate that the level of wear is satisfied. Writing the value to the register 425-*b* may, in some examples, include setting a bit in the register 425-*b*. For example, the register 425-*b* may be a mode register configured to include a bit to indicate whether a level of wear is satisfied (e.g., an available register operable to store one or more bits). The circuitry 415 may be operable to set the bit high (e.g., to a value of '1') to indicate that a previously indicated level of wear (e.g., a threshold level of wear) is satisfied. The host device may read the register 425-*b* (e.g., one or more bit values of the register 425-*b*), which may indicate to the host device whether the indicated level of wear has been satisfied.

For example, the host device may poll (e.g., read from, monitor) the register 425-*b* periodically (e.g., at set time intervals), may poll the register 425-*b* at random, or may poll the register 425-*b* in response to an indication from the memory device 405. The host device may read bit value(s) from the register 425-*b*, for example, using a read command (e.g., a mode register read command). For example, the host device may transmit the read command to the memory device 405, and the memory device 405 may read out the bit value(s) and send the bit value(s) to the host device in response to the read command.

In some examples, the circuitry 415 may indicate that the level of wear is satisfied when any metric of the memory device 405 satisfies the threshold level of wear. In such cases, the host device may not know which metric satisfied the level of wear. Accordingly, the host device may request, from the memory device 405, an indication of which metric satisfied the level of wear. In some other examples, the circuitry 415 may be operable to store measurement values of one or more metrics of the memory device 405 in respective registers 425, where each register 425 may be associated with a respective metric of the memory device 405. In such examples, the host device may read the register 425-*b* indicating that a first metric satisfied the threshold level of wear, and the host device may additionally or alternatively read one or more other registers 425 of the memory device 405 to obtain health monitoring information for one or more other corresponding metrics. The host device may use the health monitoring information for each metric to analyze respective wear-out curves for each metric, as described with reference to FIG. 3.

In some other examples, the circuitry 415 may be operable to adapt one or more of the threshold levels of wear to normalize a wear-out curve (e.g., a non-linear wear-out curve) to a linear wear-out curve. For example, the circuitry 415 may adapt one or more threshold levels of wear such that the exponential wear-out curve 305 or 315 illustrated in FIG. 3 (e.g., or some other non-linear wear-out curve) may be normalized to a linear wear-out curve, such as the linear wear-out curve 310 illustrated in FIG. 3. In some cases, a general model of the wear-out curve 305 or 315 for the respective metric (e.g., a typical model of a transistor type associated with the metric) may be known (e.g., the circuitry 415 may be configured with one or more general wear-out curves for one or more respective metrics of the memory device 405) and the circuitry 415 may be configured to scale the threshold levels of wear to deflate or inflate a degradation rate of the wear-out curve 305 or 315, respectively, based on the corresponding general model.

Each metric (e.g., each transistor type or other metric) may be associated with a respective function or process for normalizing the associated health measurements, and the circuitry 415 may be configured to utilize the respective function or process to normalize the measurements. By signaling normalized values of the wear-out curve 315, the circuitry 415 may indicate, to the host device, that although the level of wear associated with the respective metric may be less than the nominal curve, the level of wear may increase faster than expected. Additionally or alternatively, the circuitry 415 may indicate, to the host device, that although the level of wear associated with the respective metric may be more than the nominal curve, the level of wear may increase slower than expected.

In some cases, the host device may be operable to adapt one or more of the threshold levels of wear to normalize a wear-out curve (e.g., a non-linear wear-out curve) to a linear wear-out curve, as described herein. For example, the host device may use a model (e.g., a general model, known model) of the wear-out curve 305 or 315 for normalizing a respective metric (e.g., a typical model of a transistor type associated with the metric) and the host device may be configured to scale the threshold levels of wear to deflate or inflate a degradation rate of the wear-out curve 305 or 315, respectively, based on the corresponding model. As described herein, each metric (e.g., each transistor type or other metric) may be associated with a respective function or process for normalizing the metric, and the host device may be configured to utilize the respective function or process to normalize the metric.

To reduce overhead and power consumption by the host device (e.g., associated with polling the register 425-b), the circuitry 415 may, in some examples, be operable to set the pin 420 (e.g., a special function select (DSF) pin) to a first value in response to determining that the level of wear is satisfied. The pin 420 may flag the host device to indicate that the host device is to poll or monitor the register 425-b. The host device may poll the register 425-b to identify that the level of wear is satisfied based on the value of the pin 420. The pin 420 may thereby provide for the host device to refrain from continuously polling the register 425-b, which may reduce latency and power consumption.

Based on the techniques described herein, the host device may indicate one or more threshold levels of wear with an adaptable granularity, and the circuitry 415 of the memory device 405 may indicate when one or more metrics satisfy an indicated threshold level of wear. As such, the host device may obtain health monitoring information with sufficient granularity to identify or determine wear-out curves for one or more components of the memory device 405, such as the wear-out curves illustrated in FIG. 3. The host device may utilize the identified wear-out curves to improve accuracy of predicted expiration timelines (e.g., a predicted lifetime or end-of-life) for the memory device 405 or one or more components thereof, which may improve reliability and safety of the memory device 405, the host device, or both. Additionally, by setting dynamic threshold levels of wear and being flagged each time a metric satisfies a threshold, the host device may refrain from continuously performing read operations, which may reduce power consumption.

Figure 5:
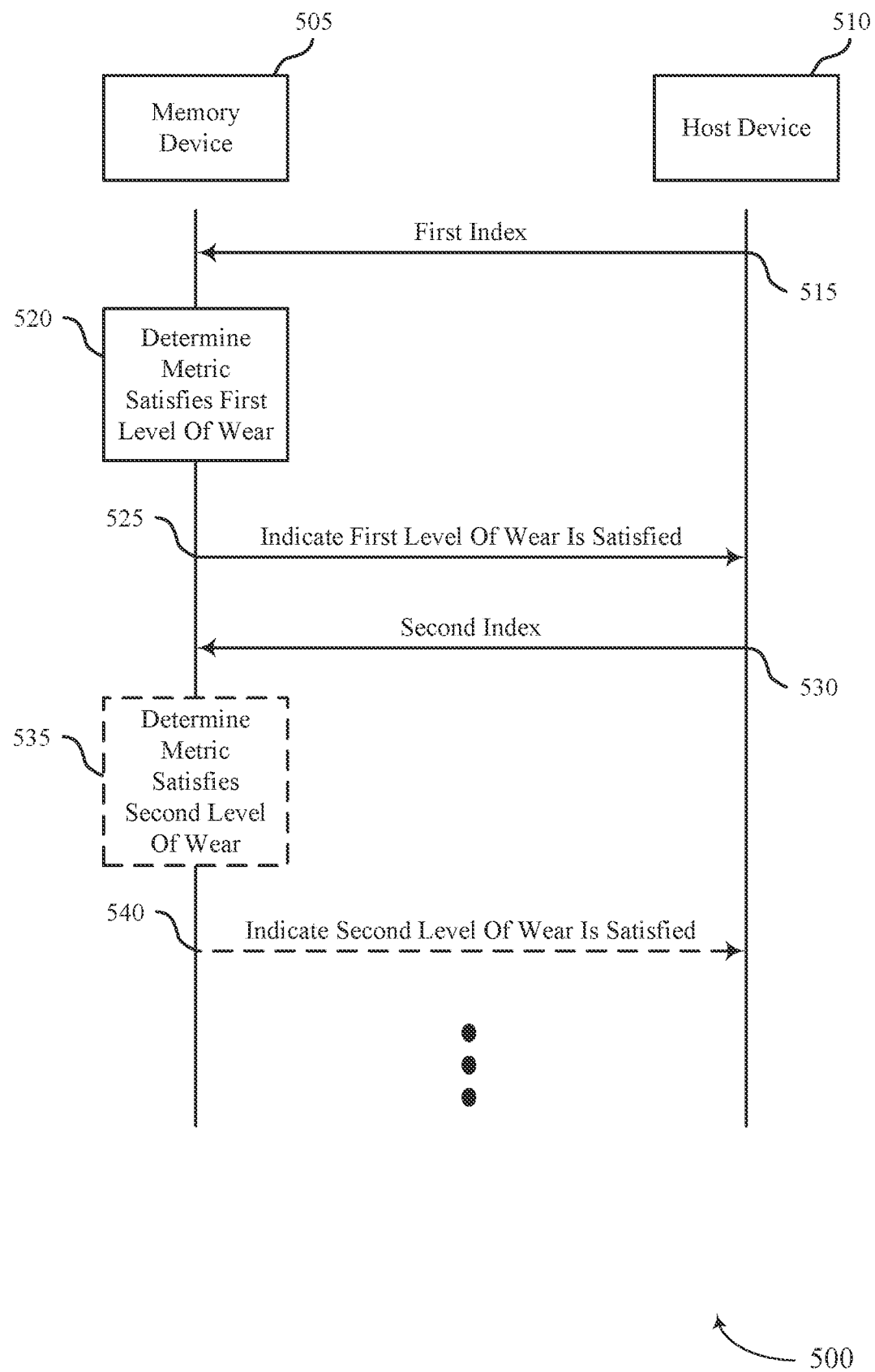
FIG. 5 illustrates an example of a process flow that supports adaptive user defined health indications in accordance with examples as disclosed herein.

FIG. 5 illustrates an example of a process flow 500 that supports adaptive user defined health indications in accordance with examples as disclosed herein. The process flow 500 may illustrate operations of a memory device 505 and a host device 510. In some examples, the host device 510 and the memory device 505 may represent examples of a host device and a memory device, or a local memory controller, as described with reference to FIGS. 1-4. The process flow 500 may illustrate a process for setting adaptive flag registers for health monitoring, as described with reference to FIGS. 1-4. Alternative examples of the process flow 500 may be implemented in which some operations are performed in a different order than described, or are not performed at all. In some cases, operations may include features not mentioned below, or additional operations may be added.

At 515, the host device 510 may indicate, to the memory device 505, a first index. The host device 510 may configure a set of multiple indexed levels of wear for the memory device 505, or the memory device may be otherwise configured with the set of multiple indexed levels of wear (e.g., which may be preconfigured or predefined for the memory device 505). The first index may correspond to a first level of wear of the set of multiple indexed levels of wear for the memory device 505, as described with reference to FIGS. 3 and 4. The host device 510 may indicate the first index by writing a first value to a set of bits in a first register of the memory device 505. The first register, for example, may be an example of the register 425-a as described with reference to FIG. 4 (e.g., an adaptive flag register). The first value may indicate the first index, which may correspond to the first level of wear (e.g., a percentage of life expectancy for a component of the memory device 505, or some other threshold).

The host device 510 may select the first index based on the first value being a first value in a configured list of values corresponding to the set of levels of wear (e.g., the first level of wear may be a lowest level of wear). Alternatively, the host device 510 may dynamically determine or ascertain the first level of wear based on one or more parameters associated with the host device 510 and the memory device 505. For example, the first level of wear may not be a lowest level of wear, and the host device 510 may select the first index (e.g., and corresponding first level of wear) from the set of multiple indexed levels of wear. The memory device 505 may access the set of bits in the first register to identify the first index (e.g., in response to the host device writing the first value to the first register).

At 520, the memory device 505 may determine that a metric of the memory device 505 satisfies the first level of wear. For example, upon accessing the first register, the memory device 505 may exit a monitoring mode (e.g., a stress mode) to read health information, before returning to the monitoring mode. The memory device 505 may perform a read to obtain health monitoring information stored within an array of the memory device 505 or within a register of the memory device 505 based on receiving the indication of the first index (e.g., based on accessing the first register). The health monitoring information may include the metric and one or more other metrics each indicative of a level of wear of a respective component of the memory device 505. The memory device 505 may determine whether the metric satisfies the first level of wear in accordance with the health monitoring information.

The memory device 505 may perform one or more measurements to obtain a health level associated with the metric, the one or more other metrics, or both (e.g., in addition or as an alternative to obtaining stored health monitoring information, or in order to determine and store the health monitoring information). For example, the memory device 505 may perform a threshold voltage measurement of one or more types of transistors being subjected to one or more types of degradation (e.g., hot carrier type stress or NBTI stress, which may include a gate oxide stress on a transistor), or the memory device 505 may measuring a timing parameter (e.g., a delta timing shift), operating frequency parameter, or temperature parameter for one or more components of the memory device 505. The one or more types of transistors, or the one or more components, may be configured to be used for measurements and may have a same type of stress applied as a similar, functional component of the memory device 505. As such, the measured parameters (e.g., metrics, levels of degradation) may correspond to a similar parameter, or corresponding level of degradation, on a same type of functional component of the memory device 505. Each metric may correspond to a different wear-out performance, level of wear, or rate of degradation, as illustrated by the three example wear-out curves in FIG. 3.

The memory device 505, or circuitry within the memory device 505, may include one or more sensors for performing the measurements, and the metric may be based on a function of one or more of the measurements. In some examples, the memory device 505 may include a single sensor for each type of measurement. Additionally or alternatively, to improve accuracy of the measurements, the memory device 505 may include multiple sensors for each type of measurement, such as multiple sensors to measure a threshold voltage of one or more components. The memory device 505 may average measurements obtained by the multiple sensors of the same type to improve an accuracy of the data (e.g., to remove outlying measurements and improve safety and reliability). In some examples, the memory device 505 may include multiple sensors operable to perform one or more types of measurements on a same component.

At 525, the memory device 505 may indicate, to the host device 510, that the first level of wear is satisfied (e.g., based on determining that the metric satisfies the first level of wear). The memory device 505 may indicate that the first level of wear is satisfied by writing a value to, or setting a bit in, a second register (e.g., a readout register) to indicate that the first level of wear is satisfied, as described with reference to FIG. 4. In some examples, the memory device 505 may set a pin (e.g., a DSF pin) to a first value (e.g., raise a flag, set the pin high) to indicate for the host device 510 to poll or monitor the second register. In some examples, the host device 510 may perform an OR operation of the pin with one or more other safety mechanisms on the memory device 505 in order to determine whether the pin is set to the first value. The host device 510 may refrain from polling the second register until the pin or some other safety mechanism is set, which may reduce power consumption and complexity. The pin may be an example of the pin 420 described with reference to FIG. 4. The host device 510 may poll, or read from, the second register by transmitting a register read command to the memory device 505, upon which the memory device 505 may access the information in the second register and send the information to the host device 510.

In some examples, the host device 510 may send a request for information regarding a type of degradation to the memory device 505 (e.g., a threshold voltage degradation, a host carrier stress degradation, or an NBTI degradation), which type of degradation may correspond to the first metric. Additionally or alternatively, the host device 510 may configure the memory device 505 to indicate a type of degradation associated with the first metric (e.g., a type of degradation that satisfies the first level of wear), or any other metrics. In such cases, and in other cases, the memory device may indicate the type of degradation to the host device 510 (e.g., when indicating that the first level of wear is satisfied, or via another indication). As such, the host device 510 may identify which metric, or which type of degradation, satisfied the first level of wear.

Additionally or alternatively, the memory device 505 may store health monitoring information for each metric in a respective register (e.g., where each register is associated with a specific metric), and the host device 510 may poll one or more registers to identify a respective level of wear for the associated metric(s), such as in response to receiving the indication that the first level of wear is satisfied. For example, if the memory device 505 indicates that the first metric associated with the wear-out curve 305 in FIG. 3 has satisfied the first level of wear (e.g., a 10 percent level of wear, a 20 percent level of wear, or some other level of wear) after the first year, the host device 510 may read, or poll, a second register associated with the metric represented by wear-out curve 315 in FIG. 3 to identify a level of wear for the metric associated with the wear-out curve 315 (e.g., may identify that the metric has reached less than five percent wear in the first year).

In some examples, the memory device 505 may normalize one or more measurements associated with a metric (e.g., a metric associated with a transistor type, a type of component, a type of measurement) to obtain a normalized level of wear associated with the metric. For example, the memory device 505 may normalize a non-linear wear-out curve based on a function associated with the respective metric, as described with reference to FIG. 4. In such examples, the memory device 505 may determine the metric satisfies the first level of wear based on a comparison of the normalized measurement with the first level of wear.

At 530, the host device 510 may indicate, to the memory device 505, a second index in response to the indication that the first level of wear is satisfied. The second index may correspond to a second level of wear, of the set of indexed levels of wear, that is different than the first level of wear. The host device 510 may indicate the second index by writing a second value to the first register, the second value corresponding to the second level of wear. Alternatively, the memory device 505 may automatically increment the index to the second index based on providing the indication that the first level of wear is satisfied.

In some examples, the second value may be next to, or adjacent to, the first value in a list of values corresponding to the set of indexed levels of wear. For example, the host device 510 may iteratively indicate indices from the list in order. The host device 510 may indicate the first index and the first level of wear based on the first value being an initial value from the list. The host device 510 may also indicate the second value based on the second value being the next value to the first value (e.g., in the list). Additionally or alternatively, the host device 510 may determine to indicate the second index and the second level of wear to the memory device 505 based on one or more parameters associated with the memory device 505, the host device 510, or both (e.g., based on a granularity of data, a wear-out curve of one or more components within the memory device 505, a desired reliability of the memory device 505, or any combination thereof). In such cases, the second value may be different than a next value from the first value in the list (e.g., the second value may not be adjacent to the first value). That is, the host device 510 may skip one or more values in the list to reduce power consumption and complexity, or to provide a higher reliability (e.g., among other examples).

At 535, the memory device 505 may determine that the metric, or some other metric of the memory device 505, satisfies the second level of wear. For example, as described herein, the memory device 505 may obtain health monitoring information in response to the indication of the second index, and the memory device 505 may determine that the level of wear is satisfied based on the health monitoring information. Additionally or alternatively, the memory device 505 may perform one or more measurements of the metrics using one or more sensors, as described herein. The metric may satisfy the second level of wear before another metric of the memory device 505, or a second metric different than the metric may satisfy the second level of wear before the metric. That is, each level of wear may be satisfied by a same metric or different metric of the memory device 505.

At 540, the memory device 505 may indicate, to the host device 510, that the second level of wear is satisfied in response to the determining. The memory device 505 may set the second register to a second value to indicate that the second level of wear is satisfied (e.g., and may set a pin to a value to indicate for the host device 510 to poll the second register). The host device 510 may issue a read command (e.g., a mode register read command) to the memory device 505, and, in response to the read command, the memory device 505 may access information in the second register and transmit that information to the host device 510.

In some examples, the host device 510 may not know which metric satisfied the second level of wear. The host device 510 may send a request for information regarding which metric satisfied the second level of wear, and the memory device 505 may indicate the metric to the host device 510 in response. In some other examples, the memory device 505 may include multiple registers and each register may correspond to a respective metric, such that the host device 510 may identify which metric satisfied the second level of wear based on which register the memory device 505 wrote to (e.g., and which register the host device 510 read or polled from).

Although FIG. 5 illustrates two iterations of the described health monitoring techniques, it is to be understood that the host device 510 may indicate any quantity of threshold levels of wear to the memory device 505 at any time and in accordance with any granularity. For example, the host device 510 may consecutively indicate three or more levels of wear (e.g., as each previous level of wear is satisfied) by indicating contiguous indices in a list of indices, or the host device 510 may dynamically select the indices from the list. The host device 510 may indicate the threshold levels of wear up to a total wear-out point (e.g., 80 percent, 90 percent, or some other total wear-out point). The total wear-out point may, for example, be determined by the host device 510 based on a use case and one or more parameters associated with the memory device 505. Once the memory device 505 indicates that a metric satisfies the total wear-out point, the host device 510 may estimate an end-of-life of the respective component based on the previously obtained health monitoring information for the component. The host device 510 may estimate the end-of-life more accurately using the obtained data than if the host device 510 assumes that the component follows a linear wear-out curve.

The host device 510 may thereby obtain health monitoring information related to one or more metrics of a memory device 505 in accordance with an adaptable granularity. The host device 510 may dynamically adapt the threshold levels of wear to monitor an estimated life expectancy of the one or more metrics without continuously reading or polling a register, which may reduce complexity and power consumption. The host device 510 may, in some examples, be configured with a general shape or wear-out curve associated with each metric and the host device 510 may assign risk levels to respective metrics based on the general wear-out curve. Alternatively, the host device 510 may develop a wear-out curve for each metric based on the received health monitoring information (e.g., the host device 510 may build wear-out curves to a use model of the host device 510).

Figure 6:
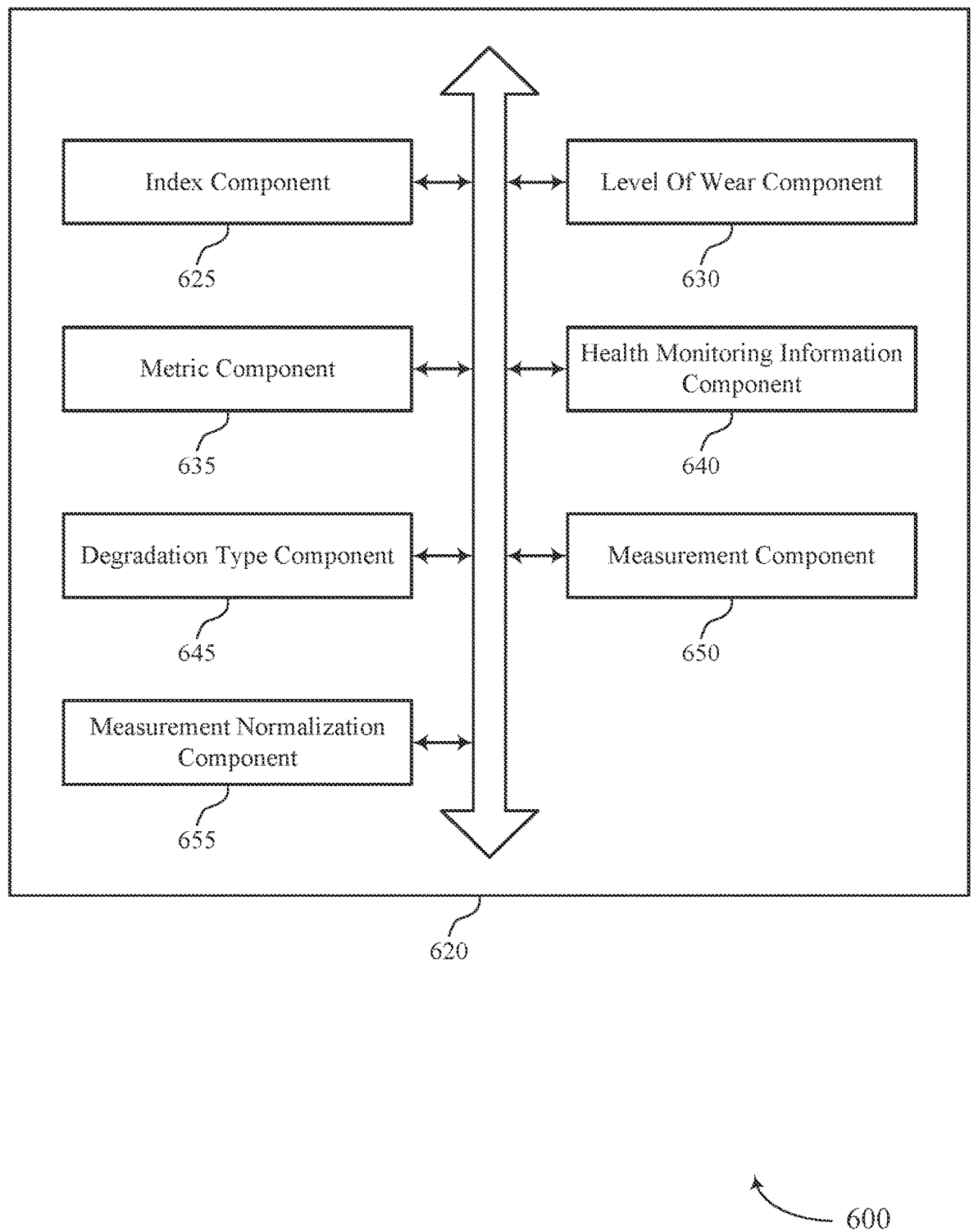
FIG. 6 shows a block diagram of a memory device that supports adaptive user defined health indications in accordance with examples as disclosed herein.

FIG. 6 shows a block diagram 600 of a memory device 620 that supports adaptive user defined health indications in accordance with examples as disclosed herein. The memory device 620 may be an example of aspects of a memory device as described with reference to FIGS. 1 through 5. The memory device 620, or various components thereof, may be an example of means for performing various aspects of adaptive user defined health indications as described herein. For example, the memory device 620 may include an index component 625, a level of wear component 630, a metric component 635, a health monitoring information component 640, a degradation type component 645, a measurement component 650, a measurement normalization component 655, or any combination thereof. Each of these components may communicate, directly or indirectly, with one another (e.g., via one or more buses).

The index component 625 may be configured as or otherwise support a means for receiving an indication of a first index from a host device, the first index corresponding to a first level of wear of a set of indexed levels of wear for a memory device. The metric component 635 may be configured as or otherwise support a means for determining, subsequent to receiving the indication of the first index, that a metric of the memory device satisfies the first level of wear. The level of wear component 630 may be configured as or otherwise support a means for indicating, to the host device, that the first level of wear is satisfied based at least in part on determining that the metric of the memory device satisfies the first level of wear. In some examples, the index component 625 may be configured as or otherwise support a means for receiving an indication of a second index from the host device in response to the indicating, the second index corresponding to a second level of wear of the set of indexed levels of wear that is different than the first level of wear.

In some examples, the index component 625 may be configured as or otherwise support a means for accessing a set of bits of a first register, the set of bits representative of the indication of the first index, where each value of the set of bits of the first register corresponds to a respective indexed level of wear of the set, and where receiving the indication of the first index is based on accessing the set of bits representative of the indication of the first index. In some examples, the index component 625 may be configured as or otherwise support a means for accessing the set of bits of the first register, the set of bits representative of the indication of the second index, where receiving the indication of the second index is based on accessing the set of bits representative of the indication of the second index.

In some examples, the health monitoring information component 640 may be configured as or otherwise support a means for determining health monitoring information including one or more metrics each indicative of a level of wear of a respective component of the memory device based on receiving the indication of the first level of wear, the one or more metrics including the metric, where determining the metric satisfies the first level of wear is based on determining the health monitoring information.

In some examples, the degradation type component 645 may be configured as or otherwise support a means for transmitting, to the host device, an indication of a type of degradation corresponding to the metric, the type of degradation including a threshold voltage degradation, a hot carrier stress degradation, an NBTI stress degradation, or any combination thereof. In some examples, the degradation type component 645 may be configured as or otherwise support a means for receiving, from the host device, a request for the type of degradation corresponding to the metric, where transmitting the indication is based on the request.

In some examples, to support indicating that the first level of wear is satisfied, the level of wear component 630 may be configured as or otherwise support a means for setting a bit in a second register to indicate that the first level of wear is satisfied. In some examples, the level of wear component 630 may be configured as or otherwise support a means for setting a pin to a first value in response to determining that the first level of wear is satisfied, where the pin indicates for the host device to monitor the second register.

In some examples, the metric corresponds to a level of degradation of one or more transistors of the memory device, the one or more transistors having a first transistor type of a set of transistor types of the memory device. In some examples, each transistor type of the set corresponds to a respective rate of degradation during operation of the memory device.

In some examples, the measurement normalization component 655 may be configured as or otherwise support a means for normalizing one or more measurements associated with a transistor type of the set of transistor types to obtain a respective level of wear associated with the metric, where each transistor type of the set is associated with a respective function for normalizing one or more associated measurements. In some examples, the level of wear component 630 may be configured as or otherwise support a means for comparing the respective level of wear associated with the metric to the first level of wear, where determining that the metric satisfies the first level of wear is based on the comparing.

In some examples, the metric component 635 may be configured as or otherwise support a means for determining, subsequent to receiving the indication of the second index, that the metric of the memory device satisfies the second level of wear. In some examples, the level of wear component 630 may be configured as or otherwise support a means for indicating, to the host device, that the second level of wear is satisfied based on determining that the metric satisfies the second level of wear. In some examples, the index component 625 may be configured as or otherwise support a means for receiving an indication of a third index from the host device in response to the indicating, the third index corresponding to a third level of wear of the set of indexed levels of wear that is different than the first level of wear and the second level of wear.

In some examples, the metric component 635 may be configured as or otherwise support a means for determining, subsequent to receiving the indication of the second index, that a second metric of the memory device satisfies the second level of wear, the second metric different than the metric. In some examples, the level of wear component 630 may be configured as or otherwise support a means for indicating, to the host device, that the second level of wear is satisfied based on determining that the second metric of the memory device satisfies the second level of wear. In some examples, the index component 625 may be configured as or otherwise support a means for receiving an indication of a third index from the host device in response to the indicating, the third index corresponding to a third level of wear of the set of indexed levels of wear that is different than the first level of wear and the second level of wear.

In some examples, the measurement component 650 may be configured as or otherwise support a means for measuring a timing parameter or a threshold voltage associated with a transistor of the memory device. In some examples, the metric component 635 may be configured as or otherwise support a means for determining the metric based on the timing parameter or the threshold voltage.

In some examples, the measurement component 650 may be configured as or otherwise support a means for obtaining, via one or more sensors, a set of measurements associated with the transistor, where the metric is based on a function of the set of measurements.

In some examples, the memory device includes a set of registers, each register of the set corresponding to a respective metric of a set of metrics each associated with a level of wear of the memory device.

Figure 7:
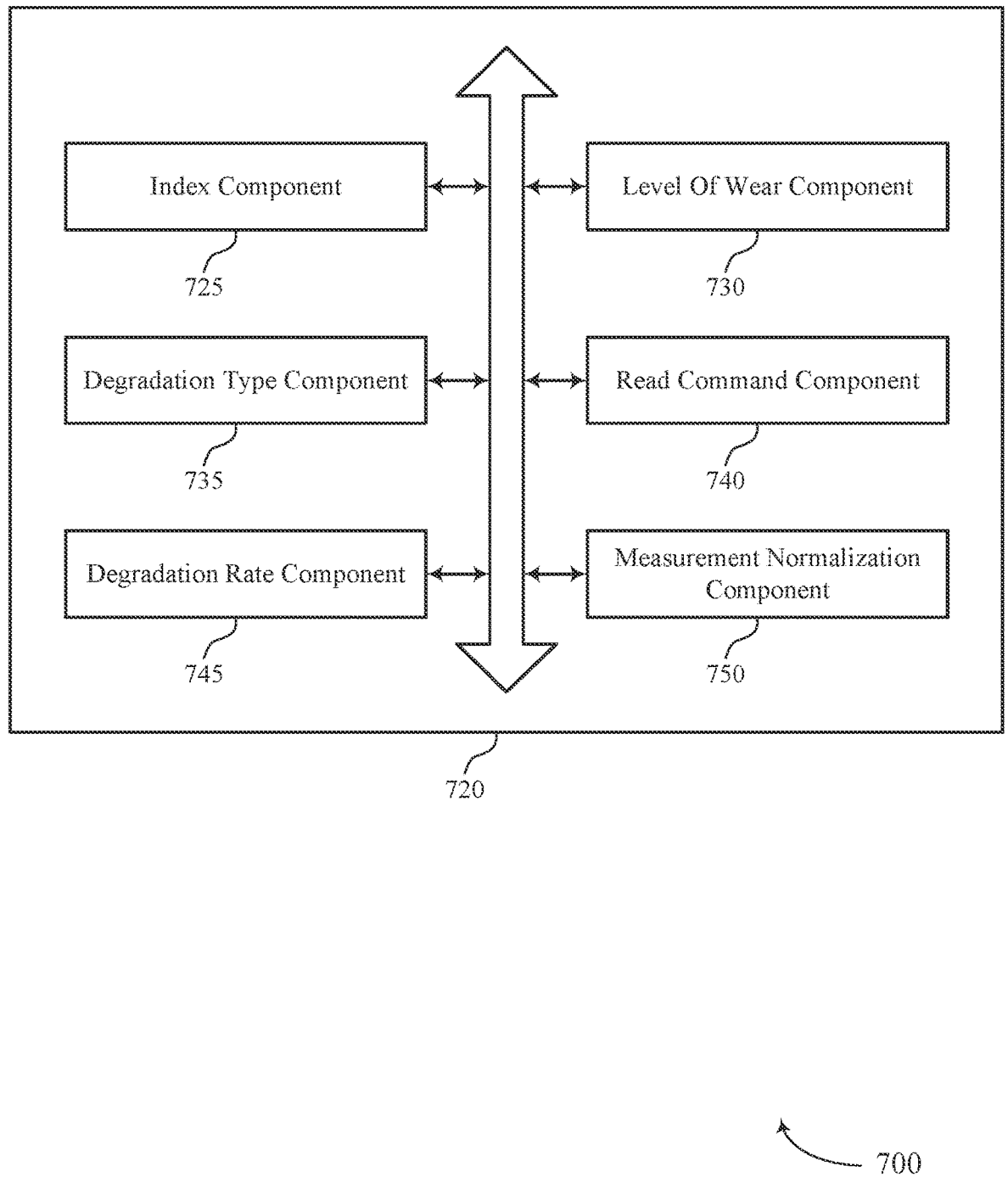
FIG. 7 shows a block diagram of a host device that supports adaptive user defined health indications in accordance with examples as disclosed herein.

FIG. 7 shows a block diagram 700 of a host device 720 that supports adaptive user defined health indications in accordance with examples as disclosed herein. The host device 720 may be an example of aspects of a host device as described with reference to FIGS. 1 through 5. The host device 720, or various components thereof, may be an example of means for performing various aspects of adaptive user defined health indications as described herein. For example, the host device 720 may include an index component 725, a level of wear component 730, a degradation type component 735, a read command component 740, a degradation rate component 745, a measurement normalization component 750, or any combination thereof. Each of these components may communicate, directly or indirectly, with one another (e.g., via one or more buses).

The index component 725 may be configured as or otherwise support a means for indicating, to a memory device, a first index, the first index corresponding to a first level of wear of a set of indexed levels of wear for the memory device. The level of wear component 730 may be configured as or otherwise support a means for receiving an indication from the memory device that a metric of the memory device satisfies the first level of wear based on indicating the first index. In some examples, the index component 725 may be configured as or otherwise support a means for indicating, to the memory device, a second index in response to the indication, the second index corresponding to a second level of wear of the set of indexed levels of wear that is different than the first level of wear.

In some examples, the index component 725 may be configured as or otherwise support a means for writing a first value to a set of bits of a first register to indicate the first index, each value of the set of bits corresponding to a respective indexed level of wear of the set, where the first value corresponds to the first level of wear. In some examples, the index component 725 may be configured as or otherwise support a means for writing a second value to the set of bits of the first register to indicate the second index, where the second value corresponds to the second level of wear.

In some examples, the second value is a next value to the first value in a list of values corresponding to the set of indexed levels of wear. In some examples, the first index is indicated based on the second value being the next value to the first value. In some examples, the index component 725 may be configured as or otherwise support a means for selecting the second index based on one or more parameters associated with the memory device, where the second value is different than a next value from the first value in a list of values corresponding to the set of indexed levels of wear.

In some examples, the degradation type component 735 may be configured as or otherwise support a means for receiving, from the memory device, an indication of a type of degradation corresponding to the metric, the type of degradation including a threshold voltage degradation, a hot carrier stress degradation, an NBTI stress degradation, or any combination thereof. In some examples, the degradation type component 735 may be configured as or otherwise support a means for transmitting, to the memory device, a request for the type of degradation corresponding to the metric, where receiving the indication is based on transmitting the request.

In some examples, to support receiving the indication, the read command component 740 may be configured as or otherwise support a means for transmitting a read command for a second register of the memory device, where receiving the indication from the memory device is based on transmitting the read command.

In some examples, the level of wear component 730 may be configured as or otherwise support a means for identifying that a pin of the memory device is set to a first value, where the pin indicates that the indication is stored at the second register.

In some examples, the metric corresponds to a level of degradation of one or more transistors of the memory device, the one or more transistors having a first transistor type of a set of transistor types of the memory device. In some examples, the degradation rate component 745 may be configured as or otherwise support a means for determining a respective rate of degradation for each transistor of the one or more transistors based on the metric that satisfies the first level of wear, where each transistor type of the set of transistor types corresponds to a respective rate of degradation during operation of the memory device.

In some examples, the measurement normalization component 750 may be configured as or otherwise support a means for normalizing one or more measurements associated with a transistor type of the set of transistor types to obtain a respective level of wear associated with the metric, where each transistor type of the set is associated with a respective process for normalizing one or more associated measurements. In some examples, the level of wear component 730 may be configured as or otherwise support a means for comparing the respective level of wear associated with the metric to the first level of wear.

In some examples, the level of wear component 730 may be configured as or otherwise support a means for receiving a second indication from the memory device that the metric of the memory device satisfies the second level of wear based on indicating the second index. In some examples, the index component 725 may be configured as or otherwise support a means for indicating a third index to the memory device based on the second indication, the third index corresponding to a third level of wear of the set of indexed levels of wear that is different than the first level of wear and the second level of wear.

In some examples, the level of wear component 730 may be configured as or otherwise support a means for receiving a second indication from the memory device that a second metric of the memory device satisfies the second level of wear based on indicating the second index, the second metric different than the metric. In some examples, the index component 725 may be configured as or otherwise support a means for indicating a third index to the memory device based on the second indication, the third index corresponding to a third level of wear of the set of indexed levels of wear that is different than the first level of wear and the second level of wear.

Figure 8:
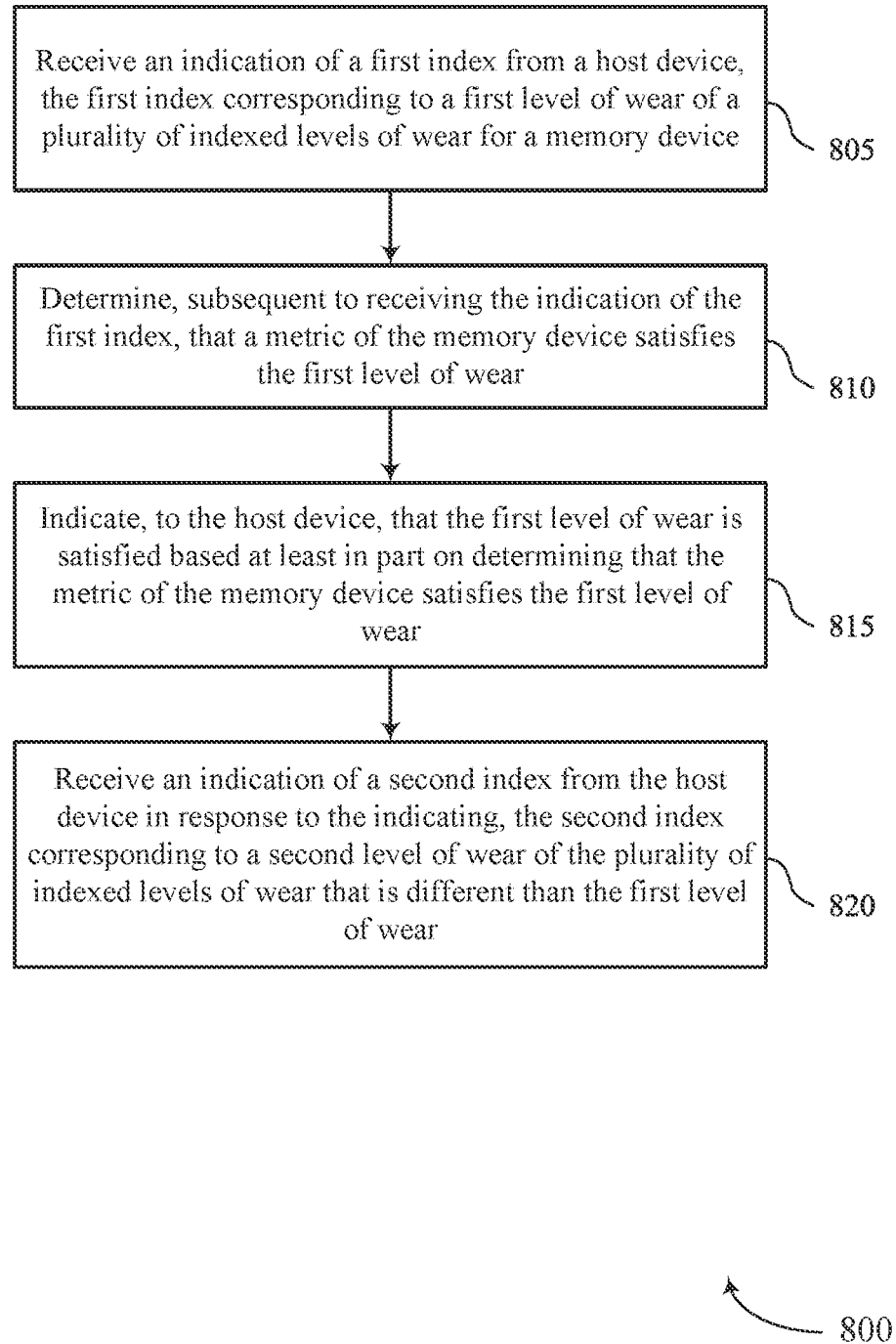
FIGS. 8 and 9 show flowcharts illustrating a method or methods that support adaptive user defined health indications in accordance with examples as disclosed herein.

FIG. 8 shows a flowchart illustrating a method 800 that supports adaptive user defined health indications in accordance with examples as disclosed herein. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 805, the method may include receiving an indication of a first index from a host device, the first index corresponding to a first level of wear of a set of indexed levels of wear for a memory device. The operations of 805 may be performed in accordance with examples as described with reference to FIGS. 4 and 5. In some examples, aspects of the operations of 805 may be performed by an index component 625 as described with reference to FIG. 6.

At 810, the method may include determining, subsequent to receiving the indication of the first index, that a metric of the memory device satisfies the first level of wear. The operations of 810 may be performed in accordance with examples as described with reference to FIGS. 4 and 5. In some examples, aspects of the operations of 810 may be performed by a metric component 634 as described with reference to FIG. 6.

At 815, the method may include indicating, to the host device, that the first level of wear is satisfied based on determining that the metric of the memory device satisfies the first level of wear. The operations of 815 may be performed in accordance with examples as described with reference to FIGS. 4 and 5. In some examples, aspects of the operations of 815 may be performed by a level of wear component 630 as described with reference to FIG. 6.

At 820, the method may include receiving an indication of a second index from the host device in response to the indicating, the second index corresponding to a second level of wear of the set of indexed levels of wear that is different than the first level of wear. The operations of 820 may be performed in accordance with examples as described with reference to FIGS. 4 and 5. In some examples, aspects of the operations of 820 may be performed by an index component 625 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for receiving an indication of a first index from a host device, the first index corresponding to a first level of wear of a set of indexed levels of wear for a memory device; determining, subsequent to receiving the indication of the first index, that a metric of the memory device satisfies the first level of wear; indicating, to the host device, that the first level of wear is satisfied based on determining that the metric of the memory device satisfies the first level of wear; and receiving an indication of a second index from the host device in response to the indicating, the second index corresponding to a second level of wear of the set of indexed levels of wear that is different than the first level of wear.

Aspect 2: The apparatus of aspect 1, further including operations, features, circuitry, logic, means, or instructions, or any combination thereof for accessing a set of bits of a first register, the set of bits representative of the indication of the first index, where each value of the set of bits of the first register corresponds to a respective indexed level of wear of the set, and where receiving the indication of the first index is based on accessing the set of bits representative of the indication of the first index and accessing the set of bits of the first register, the set of bits representative of the indication of the second index, where receiving the indication of the second index is based on accessing the set of bits representative of the indication of the second index.

Aspect 3: The apparatus of any of aspects 1 through 2, further including operations, features, circuitry, logic, means, or instructions, or any combination thereof for determining health monitoring information including one or more metrics each indicative of a level of wear of a respective component of the memory device based on receiving the indication of the first level of wear, the one or more metrics including the metric, where determining the metric satisfies the first level of wear is based on determining the health monitoring information.

Aspect 4: The apparatus of any of aspects 1 through 3, further including operations, features, circuitry, logic, means, or instructions, or any combination thereof for transmitting, to the host device, an indication of a type of degradation corresponding to the metric, the type of degradation including a threshold voltage degradation, a hot carrier stress degradation, an NBTI stress degradation, or any combination thereof.

Aspect 5: The apparatus of aspect 4, further including operations, features, circuitry, logic, means, or instructions, or any combination thereof for receiving, from the host device, a request for the type of degradation corresponding to the metric, where transmitting the indication is based on the request.

Aspect 6: The apparatus of any of aspects 1 through 5 where indicating that the first level of wear is satisfied, further includes operations, features, circuitry, logic, means, or instructions, or any combination thereof for setting a bit in a second register to indicate that the first level of wear is satisfied.

Aspect 7: The apparatus of aspect 6, further including operations, features, circuitry, logic, means, or instructions, or any combination thereof for setting a pin to a first value in response to determining that the first level of wear is satisfied, where the pin indicates for the host device to monitor the second register.

Aspect 8: The apparatus of any of aspects 1 through 7, where the metric corresponds to a level of degradation of one or more transistors of the memory device, the one or more transistors having a first transistor type of a set of transistor types of the memory device.

Aspect 9: The apparatus of aspect 8, where each transistor type of the set corresponds to a respective rate of degradation during operation of the memory device.

Aspect 10: The apparatus of any of aspects 8 through 9, further including operations, features, circuitry, logic, means, or instructions, or any combination thereof for normalizing one or more measurements associated with a transistor type of the set of transistor types to obtain a respective level of wear associated with the metric, where each transistor type of the set is associated with a respective function for normalizing one or more associated measurements and comparing the respective level of wear associated with the metric to the first level of wear, where determining that the metric satisfies the first level of wear is based on the comparing.

Aspect 11: The apparatus of any of aspects 1 through 10, further including operations, features, circuitry, logic, means, or instructions, or any combination thereof for determining, subsequent to receiving the indication of the second index, that the metric of the memory device satisfies the second level of wear; indicating, to the host device, that the second level of wear is satisfied based on determining that the metric satisfies the second level of wear; and receiving an indication of a third index from the host device in response to the indicating, the third index corresponding to a third level of wear of the set of indexed levels of wear that is different than the first level of wear and the second level of wear.

Aspect 12: The apparatus of any of aspects 1 through 10, further including operations, features, circuitry, logic, means, or instructions, or any combination thereof for determining, subsequent to receiving the indication of the second index, that a second metric of the memory device satisfies the second level of wear, the second metric different than the metric; indicating, to the host device, that the second level of wear is satisfied based on determining that the second metric of the memory device satisfies the second level of wear; and receiving an indication of a third index from the host device in response to the indicating, the third index corresponding to a third level of wear of the set of indexed levels of wear that is different than the first level of wear and the second level of wear.

Aspect 13: The apparatus of any of aspects 1 through 12, further including operations, features, circuitry, logic, means, or instructions, or any combination thereof for measuring a timing parameter or a threshold voltage associated with a transistor of the memory device and determining the metric based on the timing parameter or the threshold voltage.

Aspect 14: The apparatus of aspect 13, further including operations, features, circuitry, logic, means, or instructions, or any combination thereof for obtaining, via one or more sensors, a set of measurements associated with the transistor, where the metric is based on a function of the set of measurements.

Aspect 15: The apparatus of any of aspects 1 through 14, where the memory device includes a set of registers, each register of the set corresponding to a respective metric of a set of metrics each associated with a level of wear of the memory device.

Figure 9:
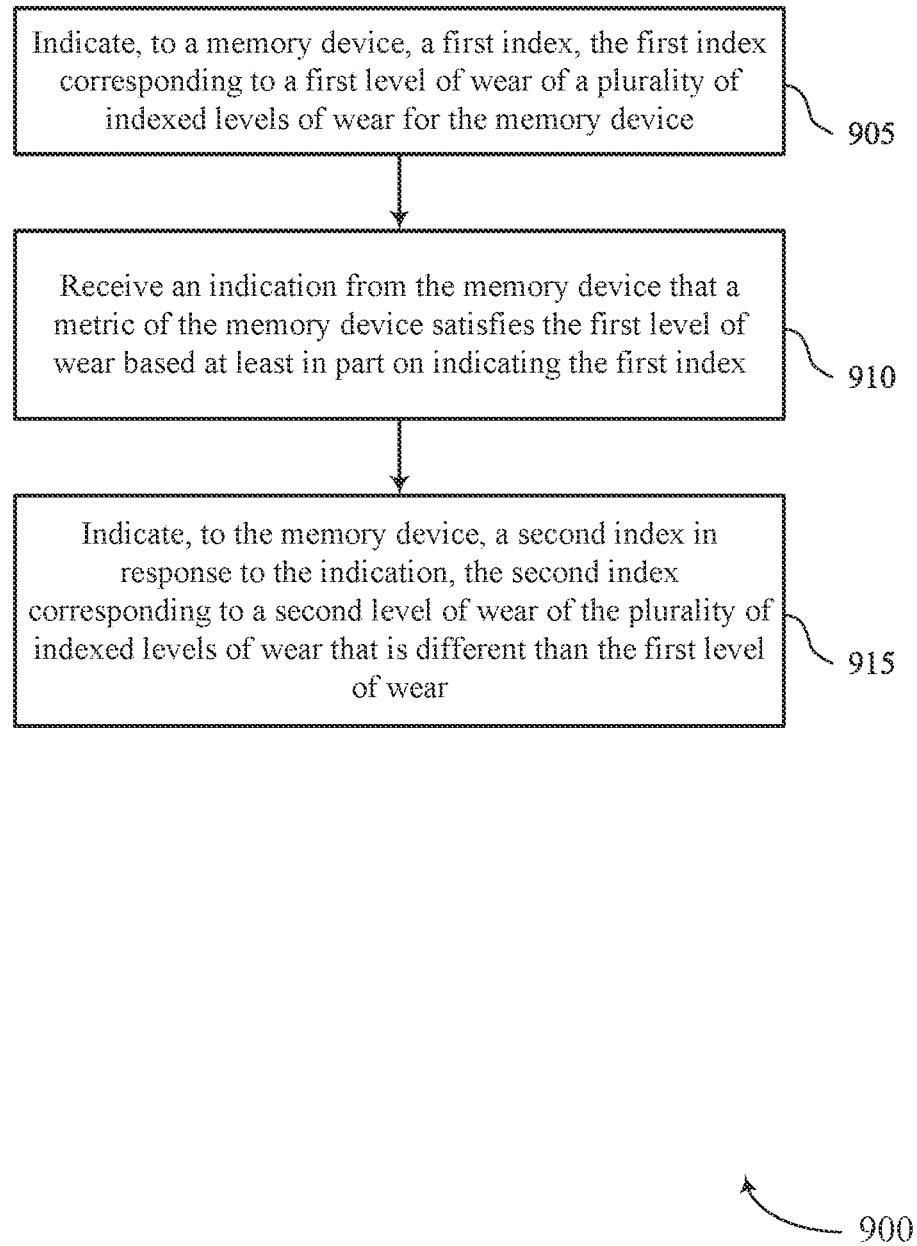

FIG. 9 shows a flowchart illustrating a method 900 that supports adaptive user defined health indications in accordance with examples as disclosed herein. The operations of method 900 may be implemented by a host device or its components as described herein. For example, the operations of method 900 may be performed by a host device as described with reference to FIGS. 1 through 5 and 7. In some examples, a host device may execute a set of instructions to control the functional elements of the device to perform the described functions. Additionally or alternatively, the host device may perform aspects of the described functions using special-purpose hardware.

At 905, the method may include indicating, to a memory device, a first index, the first index corresponding to a first level of wear of a set of indexed levels of wear for the memory device. The operations of 905 may be performed in accordance with examples as described with reference to FIGS. 4 and 5. In some examples, aspects of the operations of 905 may be performed by an index component 725 as described with reference to FIG. 7.

At 910, the method may include receiving an indication from the memory device that a metric of the memory device satisfies the first level of wear based on indicating the first index. The operations of 910 may be performed in accordance with examples as described with reference to FIGS. 4 and 5. In some examples, aspects of the operations of 910 may be performed by a level of wear component 730 as described with reference to FIG. 7.

At 915, the method may include indicating, to the memory device, a second index in response to the indication, the second index corresponding to a second level of wear of the set of indexed levels of wear that is different than the first level of wear. The operations of 915 may be performed in accordance with examples as described with reference to FIGS. 4 and 5. In some examples, aspects of the operations of 915 may be performed by an index component 725 as described with reference to FIG. 7.

In some examples, an apparatus as described herein may perform a method or methods, such as the method 900. The apparatus may include, features, circuitry, logic, means, or instructions (e.g., a non-transitory computer-readable medium storing instructions executable by a processor), or any combination thereof for performing the following aspects of the present disclosure:

Aspect 16: The apparatus, including features, circuitry, logic, means, or instructions, or any combination thereof for indicating, to a memory device, a first index, the first index corresponding to a first level of wear of a set of indexed levels of wear for the memory device; receiving an indication from the memory device that a metric of the memory device satisfies the first level of wear based on indicating the first index; and indicating, to the memory device, a second index in response to the indication, the second index corresponding to a second level of wear of the set of indexed levels of wear that is different than the first level of wear.

Aspect 17: The apparatus of aspect 16, further including operations, features, circuitry, logic, means, or instructions, or any combination thereof for writing a first value to a set of bits of a first register to indicate the first index, each value of the set of bits corresponding to a respective indexed level of wear of the set, where the first value corresponds to the first level of wear and writing a second value to the set of bits of the first register to indicate the second index, where the second value corresponds to the second level of wear.

Aspect 18: The apparatus of aspect 17, wherein the second value is a next value to the first value in a list of values corresponding to the set of indexed levels of wear and the first index is indicated based on the second value being the next value to the first value.

Aspect 19: The apparatus of aspect 17, further including operations, features, circuitry, logic, means, or instructions, or any combination thereof for selecting the second index based on one or more parameters associated with the memory device, where the second value is different than a next value from the first value in a list of values corresponding to the set of indexed levels of wear.

Aspect 20: The apparatus of any of aspects 16 through 19, further including operations, features, circuitry, logic, means, or instructions, or any combination thereof for receiving, from the memory device, an indication of a type of degradation corresponding to the metric, the type of degradation including a threshold voltage degradation, a hot carrier stress degradation, an NBTI stress degradation, or any combination thereof.

Aspect 21: The apparatus of aspect 20, further including operations, features, circuitry, logic, means, or instructions, or any combination thereof for transmitting, to the memory device, a request for the type of degradation corresponding to the metric, where receiving the indication is based on transmitting the request.

Aspect 22: The apparatus of any of aspects 16 through 21 where receiving the indication, further includes operations, features, circuitry, logic, means, or instructions, or any combination thereof for transmitting a read command for a second register of the memory device, where receiving the indication from the memory device is based on transmitting the read command.

Aspect 23: The apparatus of aspect 22, further including operations, features, circuitry, logic, means, or instructions, or any combination thereof for identifying that a pin of the memory device is set to a first value, where the pin indicates that the indication is stored at the second register.

Aspect 24: The apparatus of any of aspects 16 through 23, where the metric corresponds to a level of degradation of one or more transistors of the memory device, the one or more transistors having a first transistor type of a set of transistor types of the memory device.

Aspect 25: The apparatus of aspect 24, further including operations, features, circuitry, logic, means, or instructions, or any combination thereof for determining a respective rate of degradation for each transistor of the one or more transistors based on the metric that satisfies the first level of wear, where each transistor type of the set of transistor types corresponds to a respective rate of degradation during operation of the memory device.

Aspect 26: The apparatus of any of aspects 24 through 25, further including operations, features, circuitry, logic, means, or instructions, or any combination thereof for normalizing one or more measurements associated with a transistor type of the set of transistor types to obtain a respective level of wear associated with the metric, where each transistor type of the set is associated with a respective process for normalizing one or more associated measurements and comparing the respective level of wear associated with the metric to the first level of wear.

Aspect 27: The apparatus of aspect 16 through 26, further including operations, features, circuitry, logic, means, or instructions, or any combination thereof for receiving a second indication from the memory device that the metric of the memory device satisfies the second level of wear based on indicating the second index and indicating a third index to the memory device based on the second indication, the third index corresponding to a third level of wear of the set of indexed levels of wear that is different than the first level of wear and the second level of wear.

Aspect 28: The apparatus of any of aspects 16 through 26, further including operations, features, circuitry, logic, means, or instructions, or any combination thereof for receiving a second indication from the memory device that a second metric of the memory device satisfies the second level of wear based on indicating the second index, the second metric different than the metric and indicating a third index to the memory device based on the second indication, the third index corresponding to a third level of wear of the set of indexed levels of wear that is different than the first level of wear and the second level of wear.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 29: An apparatus, including: an array of memory cells; a first register; a second register, the second register configured to indicate whether a level of wear of the apparatus is satisfied; and circuitry configured to: receive, via the first register, an indication of a first index from a host device, the first index corresponding to a first level of wear of a set of indexed levels of wear for the apparatus; determine, subsequent to receiving the indication of the first index, that a metric of the apparatus satisfies the first level of wear; indicate, to the host device via the second register, that the first level of wear is satisfied based on determining that the metric of the apparatus satisfies the first level of wear; and receive, via the first register, an indication of a second index from the host device in response to the indicating, the second index corresponding to a second level of wear of the set of indexed levels of wear that is different than the first level of wear.

Aspect 30: The apparatus of aspect 29, where the circuitry is configured to: access a set of bits of the first register, the set of bits representative of the first index, where each value of the set of bits of the first register corresponds to a respective indexed level of wear of the set, and where receiving the indication of the first index is based on accessing the set of bits representative of the first index; and access the set of bits of the first register, the set of bits representative of the indication of the second index, where receiving the indication of the second index is based on accessing the set of bits representative of the indication of the second index.

Aspect 31: The apparatus of any of aspects 29 through 30, where the circuitry is configured to: determine health monitoring information including one or more metrics each indicative of a level of wear of a respective component of the apparatus based on receiving the indication of the first level of wear, the one or more metrics including the metric, where determining the metric satisfies the first level of wear is based on determining the health monitoring information.

Aspect 32: The apparatus of any of aspects 29 through 31, where the circuitry is configured to: set a bit in the second register to indicate that the first level of wear is satisfied.

Aspect 33: The apparatus of aspect 32, further including: a pin configured to indicate for the host device to monitor the second register, where the circuitry is configured to: set the pin high in response to determining that the first level of wear is satisfied.

Another apparatus is described. The following provides an overview of aspects of the apparatus as described herein:

Aspect 34: An apparatus, including: circuitry configured to: indicate, to a memory device coupled with the apparatus, a first index, the first index corresponding to a first level of wear of a set of indexed levels of wear for the memory device; receive an indication from the memory device that a metric of the memory device satisfies the first level of wear based on indicating the first index; and indicate, to the memory device, a second index in response to the indication, the second index corresponding to a second level of wear of the set of indexed levels of wear that is different than the first level of wear.

Aspect 35: The apparatus of aspect 34, where the circuitry is further configured to: write a first value to a set of bits of a first register to indicate the first index, each value of the set of bits corresponding to a respective indexed level of wear of the set, where the first value corresponds to the first level of wear; and write a second value to the set of bits of the first register to indicate the second index, where the second value corresponds to the second level of wear.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial materials of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    receiving an indication of a first index from a host device, the first index corresponding to a first level of wear of a plurality of indexed levels of wear for a memory device;
    determining, subsequent to receiving the indication of the first index, that a metric of the memory device satisfies the first level of wear;
    indicating, to the host device, that the first level of wear is satisfied based at least in part on determining that the metric of the memory device satisfies the first level of wear; and
    receiving an indication of a second index from the host device in response to the indicating, the second index corresponding to a second level of wear of the plurality of indexed levels of wear that is different than the first level of wear.

2. The method of claim 1, further comprising:
    accessing a plurality of bits of a first register, the plurality of bits representative of the indication of the first index, wherein each value of the plurality of bits of the first register corresponds to a respective indexed level of wear of the plurality, and wherein receiving the indication of the first index is based at least in part on accessing the plurality of bits representative of the indication of the first index; and
    accessing the plurality of bits of the first register, the plurality of bits representative of the indication of the second index, wherein receiving the indication of the second index is based at least in part on accessing the plurality of bits representative of the indication of the second index.

3. The method of claim 1, further comprising:
determining health monitoring information comprising one or more metrics each indicative of a level of wear of a respective component of the memory device based at least in part on receiving the indication of the first level of wear, the one or more metrics comprising the metric, wherein determining the metric satisfies the first level of wear is based at least in part on determining the health monitoring information.

4. The method of claim 1, further comprising:
transmitting, to the host device, an indication of a type of degradation corresponding to the metric, the type of degradation comprising a threshold voltage degradation, a hot carrier stress degradation, a negative bias temperature instability stress degradation, or any combination thereof.

5. The method of claim 4, further comprising:
receiving, from the host device, a request for the type of degradation corresponding to the metric, wherein transmitting the indication is based at least in part on the request.

6. The method of claim 1, wherein indicating that the first level of wear is satisfied further comprises:
setting a bit in a second register to indicate that the first level of wear is satisfied.

7. The method of claim 6, further comprising:
setting a pin to a first value in response to determining that the first level of wear is satisfied, wherein the pin indicates for the host device to monitor the second register.

8. The method of claim 1, wherein the metric corresponds to a level of degradation of one or more transistors of the memory device, the one or more transistors having a first transistor type of a plurality of transistor types of the memory device.

9. The method of claim 8, wherein each transistor type of the plurality corresponds to a respective rate of degradation during operation of the memory device.

10. The method of claim 8, further comprising:
normalizing one or more measurements associated with a transistor type of the plurality of transistor types to obtain a respective level of wear associated with the metric, wherein each transistor type of the plurality is associated with a respective function for normalizing one or more associated measurements; and
comparing the respective level of wear associated with the metric to the first level of wear, wherein determining that the metric satisfies the first level of wear is based at least in part on the comparing.

11. The method of claim 1, further comprising:
determining, subsequent to receiving the indication of the second index, that the metric of the memory device satisfies the second level of wear;
indicating, to the host device, that the second level of wear is satisfied based at least in part on determining that the metric satisfies the second level of wear; and
receiving an indication of a third index from the host device in response to the indicating, the third index corresponding to a third level of wear of the plurality of indexed levels of wear that is different than the first level of wear and the second level of wear.

12. The method of claim 1, further comprising:
determining, subsequent to receiving the indication of the second index, that a second metric of the memory device satisfies the second level of wear, the second metric different than the metric;
indicating, to the host device, that the second level of wear is satisfied based at least in part on determining that the second metric of the memory device satisfies the second level of wear; and
receiving an indication of a third index from the host device in response to the indicating, the third index corresponding to a third level of wear of the plurality of indexed levels of wear that is different than the first level of wear and the second level of wear.

13. The method of claim 1, further comprising:
measuring a timing parameter or a threshold voltage associated with a transistor of the memory device; and
determining the metric based at least in part on the timing parameter or the threshold voltage.

14. The method of claim 13, further comprising:
obtaining, via one or more sensors, a plurality of measurements associated with the transistor, wherein the metric is based at least in part on a function of the plurality of measurements.

15. The method of claim 1, wherein the memory device comprises a plurality of registers, each register of the plurality corresponding to a respective metric of a plurality of metrics each associated with a level of wear of the memory device.

16. A method, comprising:
indicating, to a memory device, a first index, the first index corresponding to a first level of wear of a plurality of indexed levels of wear for the memory device;
receiving an indication from the memory device that a metric of the memory device satisfies the first level of wear based at least in part on indicating the first index; and
indicating, to the memory device, a second index in response to the indication, the second index corresponding to a second level of wear of the plurality of indexed levels of wear that is different than the first level of wear.

17. The method of claim 16, further comprising:
writing a first value to a plurality of bits of a first register to indicate the first index, each value of the plurality of bits corresponding to a respective indexed level of wear of the plurality, wherein the first value corresponds to the first level of wear; and
writing a second value to the plurality of bits of the first register to indicate the second index, wherein the second value corresponds to the second level of wear.

18. The method of claim 17, wherein:
the second value is a next value to the first value in a list of values corresponding to the plurality of indexed levels of wear; and
the first index is indicated based at least in part on the second value being the next value to the first value.

19. The method of claim 17, further comprising:
selecting the second index based at least in part on one or more parameters associated with the memory device, wherein the second value is different than a next value from the first value in a list of values corresponding to the plurality of indexed levels of wear.

20. The method of claim 16, further comprising:
receiving, from the memory device, an indication of a type of degradation corresponding to the metric, the type of degradation comprising a threshold voltage degradation, a hot carrier stress degradation, a negative bias temperature instability stress degradation, or any combination thereof.

21. The method of claim 20, further comprising:
transmitting, to the memory device, a request for the type of degradation corresponding to the metric, wherein receiving the indication is based at least in part on transmitting the request.

22. The method of claim 16, wherein receiving the indication comprises:
transmitting a read command for a second register of the memory device, wherein receiving the indication from the memory device is based at least in part on transmitting the read command.

23. The method of claim 22, further comprising:
identifying that a pin of the memory device is set to a first value, wherein the pin indicates that the indication is stored at the second register.

24. The method of claim 16, wherein the metric corresponds to a level of degradation of one or more transistors of the memory device, the one or more transistors having a first transistor type of a plurality of transistor types of the memory device.

25. The method of claim 24, further comprising:
determining a respective rate of degradation for each transistor of the one or more transistors based at least in part on the metric that satisfies the first level of wear, wherein each transistor type of the plurality of transistor types corresponds to a respective rate of degradation during operation of the memory device.

26. The method of claim 24, further comprising:
normalizing one or more measurements associated with a transistor type of the plurality of transistor types to obtain a respective level of wear associated with the metric, wherein each transistor type of the plurality is associated with a respective process for normalizing one or more associated measurements; and
comparing the respective level of wear associated with the metric to the first level of wear.

27. The method of claim 16, further comprising:
receiving a second indication from the memory device that the metric of the memory device satisfies the second level of wear based at least in part on indicating the second index; and
indicating a third index to the memory device based at least in part on the second indication, the third index corresponding to a third level of wear of the plurality of indexed levels of wear that is different than the first level of wear and the second level of wear.

28. The method of claim 16, further comprising:
receiving a second indication from the memory device that a second metric of the memory device satisfies the second level of wear based at least in part on indicating the second index, the second metric different than the metric; and
indicating a third index to the memory device based at least in part on the second indication, the third index corresponding to a third level of wear of the plurality of indexed levels of wear that is different than the first level of wear and the second level of wear.

29. An apparatus, comprising:
an array of memory cells;
a first register;
a second register, the second register configured to indicate whether a level of wear of the apparatus is satisfied; and
circuitry configured to:
receive, via the first register, an indication of a first index from a host device, the first index corresponding to a first level of wear of a plurality of indexed levels of wear for the apparatus;
determine, subsequent to receiving the indication of the first index, that a metric of the apparatus satisfies the first level of wear;
indicate, to the host device via the second register, that the first level of wear is satisfied based at least in part on determining that the metric of the apparatus satisfies the first level of wear; and
receive, via the first register, an indication of a second index from the host device in response to the indicating, the second index corresponding to a second level of wear of the plurality of indexed levels of wear that is different than the first level of wear.

30. The apparatus of claim 29, wherein the circuitry is configured to:
access a plurality of bits of the first register, the plurality of bits representative of the first index, wherein each value of the plurality of bits of the first register corresponds to a respective indexed level of wear of the plurality, and wherein receiving the indication of the first index is based at least in part on accessing the plurality of bits representative of the first index; and
access the plurality of bits of the first register, the plurality of bits representative of the indication of the second index, wherein receiving the indication of the second index is based at least in part on accessing the plurality of bits representative of the indication of the second index.

31. The apparatus of claim 29, wherein the circuitry is configured to:
determine health monitoring information comprising one or more metrics each indicative of a level of wear of a respective component of the apparatus based at least in part on receiving the indication of the first level of wear, the one or more metrics comprising the metric, wherein determining the metric satisfies the first level of wear is based at least in part on determining the health monitoring information.

32. The apparatus of claim 29, wherein the circuitry is configured to:
set a bit in the second register to indicate that the first level of wear is satisfied.

33. The apparatus of claim 32, further comprising:
a pin configured to indicate for the host device to monitor the second register, wherein the circuitry is configured to:
set the pin high in response to determining that the first level of wear is satisfied.

34. An apparatus, comprising:
circuitry configured to:
indicate, to a memory device coupled with the apparatus, a first index, the first index corresponding to a first level of wear of a plurality of indexed levels of wear for the memory device;
receive an indication from the memory device that a metric of the memory device satisfies the first level of wear based at least in part on indicating the first index; and
indicate, to the memory device, a second index in response to the indication, the second index corresponding to a second level of wear of the plurality of indexed levels of wear that is different than the first level of wear.

35. The apparatus of claim 34, wherein the circuitry is further configured to:
- write a first value to a plurality of bits of a first register to indicate the first index, each value of the plurality of bits corresponding to a respective indexed level of wear of the plurality, wherein the first value corresponds to the first level of wear; and
- write a second value to the plurality of bits of the first register to indicate the second index, wherein the second value corresponds to the second level of wear.

* * * * *